US012748810B2

(12) United States Patent
Bailey et al.

(10) Patent No.: US 12,748,810 B2
(45) Date of Patent: Sep. 29, 2026

(54) CONTAINER IMAGE STORAGE INSIDE DATABASE FOR SECURED AND OPTIMIZED CODE EXECUTION

(71) Applicant: Snowflake Inc., Bozeman, MT (US)

(72) Inventors: David B. Bailey, Signal Mountain, TN (US); Benoit Dageville, San Mateo, CA (US); Derek Denny-Brown, Seattle, WA (US); Subramanian Muralidhar, Mercer Island, WA (US); Arun Ponnusamy, Fremont, CA (US); Sumanth Subramanya Rao, Seattle, WA (US); Mihir Sathe, Seattle, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/678,528

(22) Filed: May 30, 2024

(65) Prior Publication Data

US 2025/0371081 A1 Dec. 4, 2025

(51) Int. Cl.

*G06F 16/951* (2019.01)
*G06F 16/11* (2019.01)
*G06F 16/955* (2019.01)

(52) U.S. Cl.

CPC .......... *G06F 16/951* (2019.01); *G06F 16/116* (2019.01); *G06F 16/9566* (2019.01)

(58) Field of Classification Search

CPC ............... G06F 16/951; G06F 16/9566; G06F 16/116

See application file for complete search history.

(56) References Cited

U.S. PATENT DOCUMENTS

| | | | | |
|---|---|---|---|---|
| 2015/0281111 A1* | 10/2015 | Carl | H04L 47/70 | 709/226 |
| 2016/0026858 A1* | 1/2016 | Vogel | G06F 16/51 | 382/203 |

(Continued)

OTHER PUBLICATIONS

Github, "Open Container Initiative Distribution Specification", [Online]. Retrieved from the Internet: <https://github.com/opencontainers/distribution-spec/blob/main/spec.md>, (Accessed online Jun. 19, 2025), 26 pages.

(Continued)

*Primary Examiner* — Courtney Harmon
(74) *Attorney, Agent, or Firm* — Schwegman Lundberg & Woessner, P.A.

(57) ABSTRACT

The subject technology receives a first set of statements to create an image repository, the first set of statements comprising a set of Structured Query Language (SQL) statements. The subject technology creates the image repository, the creating including generating a uniform resource locator (URL), the URL associated with a location for storing data. The subject technology performs a domain name service (DNS) mapping of the URL to an image registry service. The subject technology receives a first command to tag a container image to an alias corresponding to the URL. The subject technology assigns the alias to the container image. The subject technology receives a second command to push the tagged container image to the image repository. The subject technology sends the tagged container image to the location to store the tagged container image.

20 Claims, 11 Drawing Sheets

(56) References Cited

U.S. PATENT DOCUMENTS

| | | | | |
|---|---|---|---|---|
| 2017/0212910 | A1* | 7/2017 | Morris | G06T 3/40 |
| 2019/0065619 | A1* | 2/2019 | Kuo | G06F 16/9574 |
| 2021/0097477 | A1* | 4/2021 | Zhang | G01N 21/90 |
| 2021/0279212 | A1* | 9/2021 | Kazmi | G06F 16/211 |
| 2023/0253096 | A1* | 8/2023 | Hodgeman | G16H 30/20<br>705/2 |
| 2024/0077997 | A1* | 3/2024 | Kale | G06F 3/04845 |

OTHER PUBLICATIONS

Snowflake Documentation, "Snowpark Container Services commands", [Online]. Retrieved from the Internet: <https://docs.snowflake.com/en/sql-reference/commands-snowpark-container-services>, (Accessed online Jun. 19, 2025), 2 pages.

* cited by examiner

CONTAINER IMAGE STORAGE INSIDE DATABASE FOR SECURED AND OPTIMIZED CODE EXECUTION

TECHNICAL FIELD

Embodiments of the disclosure relate generally to databases and, more specifically, providing an image repository for containers for performing tasks in conjunction with such databases.

BACKGROUND

Databases are an organized collection of data that enable data to be easily accessed, manipulated, and updated. Databases serve as a method of storing, managing, and retrieving information in an efficient manner. Traditional database management requires companies to provision infrastructure and resources to manage the database in a data center. Management of a traditional database can be very costly and requires oversight by multiple persons having a wide range of technical skill sets.

Databases are widely used for data storage and access in computing applications. A goal of database storage is to provide enormous sums of information in an organized manner so that it can be accessed, managed, and updated.

Traditional relational database management systems (RDMS) require extensive computing and storage resources and have limited scalability. Large sums of data may be stored across multiple computing devices. A server may manage the data such that it is accessible to customers with on-premises operations. For an entity that wishes to have an in-house database server, the entity must expend significant resources on a capital investment in hardware and infrastructure for the database, along with significant physical space for storing the database infrastructure. Further, the database may be highly susceptible to data loss during a power outage or other disaster situations. Such traditional database systems have significant drawbacks that may be alleviated by a cloud-based database system.

A cloud database system may be deployed and delivered through a cloud platform that allows organizations and end users to store, manage, and retrieve data from the cloud. Some cloud database systems include a traditional database architecture that is implemented through the installation of database software on top of a computing cloud. The database may be accessed through a Web browser or an application programming interface (API) for application and service integration. Some cloud database systems are operated by a vendor that directly manages backend processes of database installation, deployment, and resource assignment tasks on behalf of a client. The client may have multiple end users that access the database by way of a Web browser and/or API. Cloud databases may provide significant benefits to some clients by mitigating the risk of losing database data and allowing the data to be accessed by multiple users across multiple geographic regions.

When certain information is to be extracted from a database, a query statement may be executed against the database data. A network-based database system processes the query and returns certain data according to one or more query predicates that indicate what information should be returned by the query. The database system extracts specific data from the database and formats that data into a readable form.

Queries can be executed against database data to find certain data within the database. A database query extracts data from the database and formats it into a readable form. For example, when a user wants data from a database, the user may write a query in a query language supported by the database. The query may request specific information from the database. The query may request any pertinent information that is stored within the database. If the appropriate data can be found to respond to the query, the database has the potential to reveal complex trends and activities.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
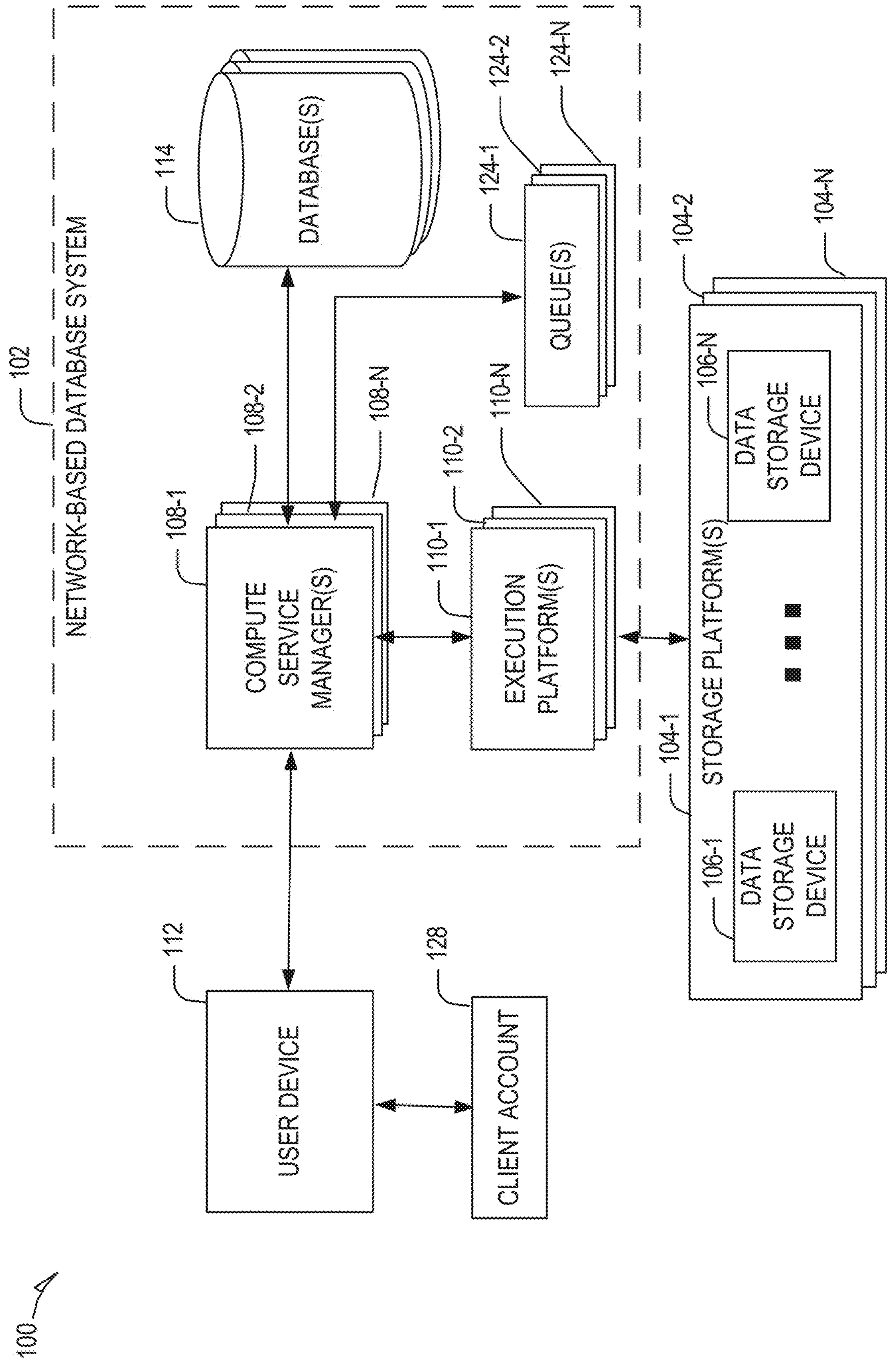
FIG. 1 illustrates an example computing environment that includes a network-based database system in communication with a storage platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Databases are used by various entities and companies for storing information that may need to be accessed or analyzed. In an example, a retail company may store a listing of all sales transactions in a database. The database may include information about when a transaction occurred, where it occurred, a total cost of the transaction, an identifier and/or description of all items that were purchased in the transaction, and so forth. The same retail company may also store, for example, employee information in that same database that might include employee names, employee contact information, employee work history, employee pay rate, and so forth. Depending on the needs of this retail company, the employee information and transactional information may be stored in different tables of the same database. The retail company may have a need to "query" its database when it wants to learn information that is stored in the database. This retail company may want to find data about, for example, the names of all employees working at a certain store, all employees working on a certain date, all transactions for a certain product made during a certain time frame, and so forth.

When the retail store wants to query its database to extract certain organized information from the database, a query statement is executed against the database data. The query returns certain data according to one or more query predicates that indicate what information should be returned by the query. The query extracts specific data from the database and formats that data into a readable form. The query may be written in a language that is understood by the database, such as Structured Query Language ("SQL"), so the database systems can determine what data should be located and how it should be returned. The query may request any pertinent information that is stored within the database. If the appropriate data can be found to respond to the query, the database has the potential to reveal complex trends and activities. This power can only be harnessed through the use of a successfully executed query.

The systems, methods, and devices described herein provide embodiments for scheduling and executing tasks on shared storage and execution platforms. The systems, methods, and devices described herein may be implemented on network-based database platforms. Further, the implementations described herein enable queries to be executed on behalf of a client account.

FIG. 1 illustrates an example computing environment 100 that includes a network-based database system 102 in communication with a storage platform 104-1, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

In some embodiments, the network-based database system 102 includes compute service manager 108-1 to compute service manager 108-N, each of which can be in communication with one or more of queue 124-1 to queue 124-N, a client account 128, database(s) 114, and execution platform 110-1 to execution platform 110-N. In embodiments, each execution platform can correspond to a given (or different) cloud service provider (e.g., AWS®, Google Cloud Platform®, Microsoft Azure®, and the like).

In an embodiment, a compute service manager (e.g., any of the compute service managers shown in FIG. 1) does not receive any direct communications from a client account 128 and only receives communications concerning jobs from the queue. In particular implementations, a compute service manager can support any number of client accounts 128 such as end users corresponding to respective one or more of user device 112 that provide data storage and retrieval requests, system administrators managing the systems and methods described herein, and other components/devices that interact with the compute service manager. As used herein, a compute service manager may also be referred to as a "global services system" that performs various functions as discussed herein, and each of compute service manager 108-1 to compute service manager 108-N can correspond to a particular cluster (or clusters) of computing resources as described further herein.

Thus it is appreciated that embodiments of the subject technology can provide multiple instances of the aforementioned components, where each instance of a compute service manager can also utilize different instances of an execution platform, database, or queue. In particular, it is appreciated that the network-based database system 102 provides different instances of components to enable different versions of databases or execution platforms to be utilized by a given compute service manager, ensuring further flexibility to perform operations in connection with executing queries (e.g., received from client account 128 associated with user device 112). For example, a particular query can be compatible with a particular version of a database or execution platform, and it can be imperative that a given compute service manager facilitate execution of such a query to that particular of the database or execution platform as provided by the network-based database system 102.

As shown, the computing environment 100 comprises the network-based database system 102 and a storage platform 104 (e.g., AWS®, Microsoft Azure Blob Storage®, or Google Cloud Storage®). The network-based database system 102 is used for accessing and/or processing integrated data from one or more disparate sources including data storage devices 106-1 to 106-N within the storage platform 104. The storage platform 104 comprises a plurality of computing machines and provides on-demand computer system resources such as data storage and computing power to the network-based database system 102.

The network-based database system 102 includes one or more compute service managers, execution platforms, and databases. The network-based database system 102 hosts and provides database services to multiple client accounts. Administrative users can create and manage identities (e.g., users, roles, and groups) and use permissions to allow or deny access to the identities to resources and services.

Each compute service manager (e.g., any of the compute service managers shown in FIG. 1) coordinates and manages operations of the network-based database system 102. The compute service manager also performs query optimization and compilation as well as managing clusters of computing services that provide compute resources (also referred to as "virtual warehouses"). The compute service manager can support any number of client accounts such as end users providing data storage and retrieval requests, system administrators managing the systems and methods described herein, and other components/devices that interact with compute service manager 108-1.

The compute service manager (e.g., any of the compute service managers shown in FIG. 1) is also in communication with a user device 112. The user device 112 corresponds to a user of one of the multiple client accounts supported by the network-based database system 102. As shown, the user is associated with a client account 128. In some embodiments, the compute service manager 108-1 does not receive any direct communications from the user device 112 and only receives communications concerning jobs from a queue 124-1 within the network-based database system 102.

The compute service manager is also coupled to one or more database 114, which is associated with the data stored in the computing environment 100. The database 114 stores data pertaining to various functions and aspects associated with the network-based database system 102 and its users. In some embodiments, the database 114 includes a summary of data stored in remote data storage systems as well as data available from a local cache. Additionally, the database 114 may include information regarding how data is organized in remote data storage systems (e.g., the storage platform 104) and the local caches. The database 114 allows systems and services to determine whether a piece of data needs to be accessed without loading or accessing the actual data from a storage device. In an embodiment, database 114 may be a distributed database such as FoundationDB, and the like.

In embodiments, the compute service manager is also coupled to one or more metadata databases that store metadata pertaining to various functions and aspects associated with the network-based database system 102 and its users. In an embodiment, a data structure can be utilized for storage of database metadata in the metadata database. For example, such a data structure may be generated from metadata micro-partitions and may be stored in a metadata cache memory. The data structure includes table metadata pertaining to database data stored across a table of the database. The table may include multiple micro-partitions serving as immutable storage devices that cannot be updated in-place. Each of the multiple micro-partitions can include numerous rows and columns making up cells of database data. The table metadata may include a table identification and versioning information indicating, for example, how many versions of the table have been generated over a time period, which version of the table includes the most up-to-date information, how the table was changed over time, and so forth. A new table version may be generated each time a transaction is executed on the table, where the transaction may include a DML statement such as an insert, delete, merge, and/or update command. Each time a DML statement is executed on the table, and a new table version is generated, one or more new micro-partitions may be generated that reflect the DML statement.

In an embodiment, the aforementioned table metadata includes global information about the table of a specific version. The aforementioned data structure further includes file metadata that includes metadata about a micro-partition of the table. The terms "file" and "micro-partition" may each refer to a subset of database data and may be used interchangeably in some embodiments. The file metadata includes information about a micro-partition of the table. Further, metadata may be stored for each column of each micro-partition of the table. The metadata pertaining to a column of a micro-partition may be referred to as an expression property (EP) and may include any suitable information about the column, including for example, a minimum and maximum for the data stored in the column, a type of data stored in the column, a subject of the data stored in the column, versioning information for the data stored in the column, file statistics for all micro-partitions in the table, global cumulative expressions for columns of the table, and so forth. Each column of each micro-partition of the table may include one or more expression properties. It should be appreciated that the table may include any number of micro-partitions, and each micro-partition may include any number of columns. The micro-partitions may have the same or different columns and may have different types of columns storing different information. As discussed further herein, the subject technology provides a file system that includes "EP" files (expression property files), where each of the EP files stores a collection of expression properties about corresponding data. As described further herein, each EP file (or the EP files, collectively) can function similar to an indexing structure for micro-partition metadata. Stated another way, each EP file contains a "region" of micro-partitions, and the EP files are the basis for persistence, cache organization and organizing the multi-level structures of a given table's EP metadata. Additionally, in some implementations of the subject technology, a two-level data structure (also referred to as "2-level EP" or a "2-level EP file") can at least store metadata corresponding to grouping expression properties and micro-partition statistics.

As mentioned above, a table of a database may include many rows and columns of data. One table may include millions of rows of data and may be very large and difficult to store or read. A very large table may be divided into multiple smaller files corresponding to micro-partitions. For example, one table may be divided into six distinct micro-partitions, and each of the six micro-partitions may include a portion of the data in the table. Dividing the table data into multiple micro-partitions helps to organize the data and to find where certain data is located within the table.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed).

Groups of rows in tables may be mapped into individual micro-partitions organized in a columnar fashion. This size and structure allow for extremely granular selection of the micro-partitions to be scanned, which can be composed of millions, or even hundreds of millions, of micro-partitions. This granular selection process may be referred to herein as "pruning" based on metadata as described further herein.

In an example, pruning involves using metadata to determine which portions of a table, including which micro-partitions or micro-partition groupings in the table, are not pertinent to a query, and then avoiding those non-pertinent micro-partitions (e.g., files) and micro-partition groupings (e.g., regions) when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

The micro-partitions as described herein can provide considerable benefits for managing database data, finding database data, and organizing database data. Each micro-partition organizes database data into rows and columns and stores a portion of the data associated with a table. One table may have many micro-partitions. The partitioning of the database data among the many micro-partitions may be done in any manner that makes sense for that type of data.

A query may be executed on a database table to find certain information within the table. To respond to the query, a compute service manager scans the table to find the information requested by the query. The table may include millions and millions of rows, and it would be very time consuming and it would require significant computing resources for the compute service manager to scan the entire table. The micro-partition organization along with the systems, methods, and devices for database metadata storage of the subject technology provide significant benefits by at least shortening the query response time and reducing the amount of computing resources that are required for responding to the query.

The compute service manager may find the cells of database data by scanning database metadata. The multiple level database metadata of the subject technology enables the compute service manager to quickly and efficiently find the correct data to respond to the query. The compute service manager may find the correct table by scanning table metadata across all the multiple tables in a given database. The compute service manager may find a correct grouping of micro-partitions by scanning multiple grouping expression properties across the identified table. Such grouping expression properties include information about database data stored in each of the micro-partitions within the grouping.

The compute service manager may find a correct micro-partition by scanning multiple micro-partition expression properties within the identified grouping of micro-partitions. The compute service manager may find a correct column by scanning one or more column expression properties within the identified micro-partition. The compute service manager may find the correct row(s) by scanning the identified column within the identified micro-partition. The compute service manager may scan the grouping expression properties to find groupings that have data based on the query. The compute service manager reads the micro-partition expression properties for that grouping to find one or more individual micro-partitions based on the query. The compute service manager reads column expression properties within each of the identified individual micro-partitions. The compute service manager scans the identified columns to find the applicable rows based on the query.

In an embodiment, an expression property is information about the one or more columns stored within one or more micro-partitions. For example, multiple expression properties are stored that each pertain to a single column of a single micro-partition. In an alternative embodiment, one or more expression properties are stored that pertain to multiple columns and/or multiple micro-partitions and/or multiple tables. The expression property is any suitable information about the database data and/or the database itself. In an embodiment, the expression property includes one or more of: a summary of database data stored in a column, a type of database data stored in a column, a minimum and maximum for database data stored in a column, a null count for database data stored in a column, a distinct count for database data stored in a column, a structural or architectural indication of how data is stored, and the like. It is appreciated that a given expression property is not limited to a single column, and can also be applied to a predicate. In addition, an expression property can be derived from a base expression property of all involving columns.

In an embodiment, the metadata organization structures of the subject technology may be applied to database "pruning" based on the metadata as described further herein. The metadata organization may lead to extremely granular selection of pertinent micro-partitions of a table. Pruning based on metadata is executed to determine which portions of a table of a database include data that is relevant to a query. Pruning is used to determine which micro-partitions or groupings of micro-partitions are relevant to the query, and then scanning only those relevant micro-partitions and avoiding all other non-relevant micro-partitions. By pruning the table based on the metadata, the subject system can save significant time and resources by avoiding all non-relevant micro-partitions when responding to the query. After pruning, the system scans the relevant micro-partitions based on the query.

In an embodiment, the metadata database includes EP files (expression property files), where each of the EP files store a collection of expression properties about corresponding data. As mentioned before, EP files provide a similar function to an indexing structure into micro-partition metadata. Metadata may be stored for each column of each micro-partition of a given table. In an embodiment, the aforementioned EP files can be stored in a cache provided by the subject system for such EP files (e.g., "EP cache").

In some embodiments, the compute service manager may determine that a job should be performed based on data from the database 114. In such embodiments, the compute service manager may scan the data and determine that a job should be performed to improve data organization or database performance. For example, the compute service manager may determine that a new version of a source table has been generated and the pruning index has not been refreshed to reflect the new version of the source table. The database 114 may include a transactional change tracking stream indicating when the new version of the source table was generated and when the pruning index was last refreshed. Based on that transaction stream, the compute service manager may determine that a job should be performed. In some embodiments, the compute service manager determines that a job should be performed based on a trigger event and stores the job in a queue until the compute service manager is ready to schedule and manage the execution of the job. In an embodiment of the disclosure, the compute service manager determines whether a table or pruning index needs to be reclustered based on one or more DML commands being performed, wherein one or more of DML commands constitute the trigger event.

The compute service manager may receive rules or parameters from the client account 128 and such rules or parameters may guide the compute service manager in scheduling and managing internal jobs. The client account 128 may indicate that internal jobs should only be executed at certain times or should only utilize a set maximum amount of processing resources. The client account 128 may further indicate one or more trigger events that should prompt the compute service manager to determine that a job should be performed. The client account 128 may provide parameters concerning how many times a task may be re-executed and/or when the task should be re-executed.

The compute service manager is in communication with one or more queue 124-1. In an embodiment, the compute service manager does not receive any direct communications from a client account 128 and only receives communications concerning jobs from the queue 124-1. In particular implementations, the compute service manager can support any number of client accounts 128 such as end users providing data storage and retrieval requests, system administrators managing the systems and methods described herein, and other components/devices that interact with compute service manager.

The queue 124-1 may provide a job to the compute service manager. One or more jobs may be stored in the queue 124-1 in an order of receipt and/or an order of priority, and each of those one or more jobs may be communicated to the compute service manager to be scheduled and executed.

In an implementation, the queue 124-1 may determine a job to be performed based on a trigger event such as the ingestion of data, deleting one or more rows in a table, updating one or more rows in a table, a materialized view becoming stale with respect to its source table, a table reaching a predefined clustering threshold indicating the table should be reclustered, and so forth.

The queue 124-1 may determine internal jobs that should be performed to improve the performance of the database and/or to improve the organization of database data. In an embodiment, the queue 124-1 does not store queries to be executed for a client account but instead only stores database jobs that improve database performance.

A compute service manager is further coupled to an execution platform (e.g., one of execution platform 110-1, execution platform 110-2, execution platform 110-N), which provides multiple computing resources that execute various data storage and data retrieval tasks. The execution platform is coupled to one of a storage platform (e.g., storage platform 104-1, storage platform 104-2, storage platform 104-N). The storage platform 104-1 comprises multiple data storage devices 106-1 to 106-N, and each other storage platform can also include multiple data storage devices. In some embodiments, the data storage devices 106-1 to 106-N are cloud-based storage devices located in one or more geographic locations. For example, the data storage devices 106-1 to 106-N may be part of a public cloud infrastructure or a private cloud infrastructure. The data storage devices 106-1 to 106-N may be hard disk drives (HDDs), solid state drives (SSDs), storage clusters, AMAZON S3 storage systems or any other data storage technology. Additionally, the storage platform 104 may include distributed file systems (such as Hadoop Distributed File Systems (HDFS)), object storage systems, and the like. Similarly, any of the data storage devices in other storage platforms can also have similar characteristics described above in connection with storage platform 104-1.

The execution platform (e.g., any of the execution platforms shown in FIG. 1) comprises a plurality of compute nodes. A set of processes on a compute node executes a query plan compiled by the compute service manager. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 108-1; a fourth process to establish communication with the compute service manager 108-1 after a system boot; and a fifth process to handle all communication with a compute cluster for a given job provided by the compute service manager 108-1 and to communicate information back to the compute service manager 108-1 and other compute nodes of the execution platform.

A relational join is a data processing operation in a relational data management system. For example, a join is a binary operator, taking two relations R and S, and a binary predicate θ as inputs, and producing a single relation which contains the set of all combinations of tuples in R and S which satisfy the predicate θ.

In an example, a single query can performs multiple join operations (among other types of operations), and a tree-shaped (or tree structure) execution plan (e.g., a query plan) can be generated to represent the query where such a query plan includes a set of nodes corresponding to various operations that are performed during query execution. For illustration, join operations can form intermediate nodes and group nodes of the tree structure representing the query plan, while base relations form analogous leaves of that tree structure of the query plan. Data flows from the leaves of the tree structure towards the root, where the final query result is produced.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 106-1 to 106-N are decoupled from the computing resources associated with the execution platform 110-1. This architecture supports dynamic changes to the network-based database system 102 based on the changing data storage/retrieval needs as well as the changing needs of the users and systems. The support of dynamic changes allows the network-based database system 102 to scale quickly in response to changing demands on the systems and components within the network-based database system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

Each of compute service manager, database, execution platform, and storage platform shown in FIG. 1 may be implemented as a distributed system (e.g., distributed across multiple systems/platforms at multiple geographic locations). Additionally, each of the compute service manager, database, execution platform, and storage platform can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by a compute service manager. These jobs are scheduled and managed by the compute service manager to determine when and how to execute the job. For example, the compute service manager may divide the job into multiple discrete tasks and may determine what data is needed to execute each of the multiple discrete tasks. The compute service manager may assign each of the multiple discrete tasks to one or more nodes of an execution platform to process the task. The compute service manager 108-1 may determine what data is needed to process a task and further determine which nodes within the execution platform 110-1 are best suited to process the task. Some nodes may have already cached the data needed to process the task and, therefore, be a good candidate for processing the task. Metadata stored in the database 114 assists the compute service manager in determining which nodes in the execution platform have already cached at least a portion of the data needed to process the task. One or more nodes in the execution platform process the task using data cached by the nodes and, if necessary, data retrieved from the storage platform. It is desirable to retrieve as much data as possible from caches within the execution platform because the retrieval speed is typically much faster than retrieving data from the storage platform.

As shown in FIG. 1, the computing environment 100 separates the execution platforms from the storage platforms. In this arrangement, the processing resources and cache resources in the execution platforms operate independently of the data storage devices in the storage platforms. Thus, the computing resources and cache resources are not restricted to specific data storage devices. Instead, all computing resources and all cache resources may retrieve data from, and store data to, any of the data storage resources in the storage platform.

Figure 2:
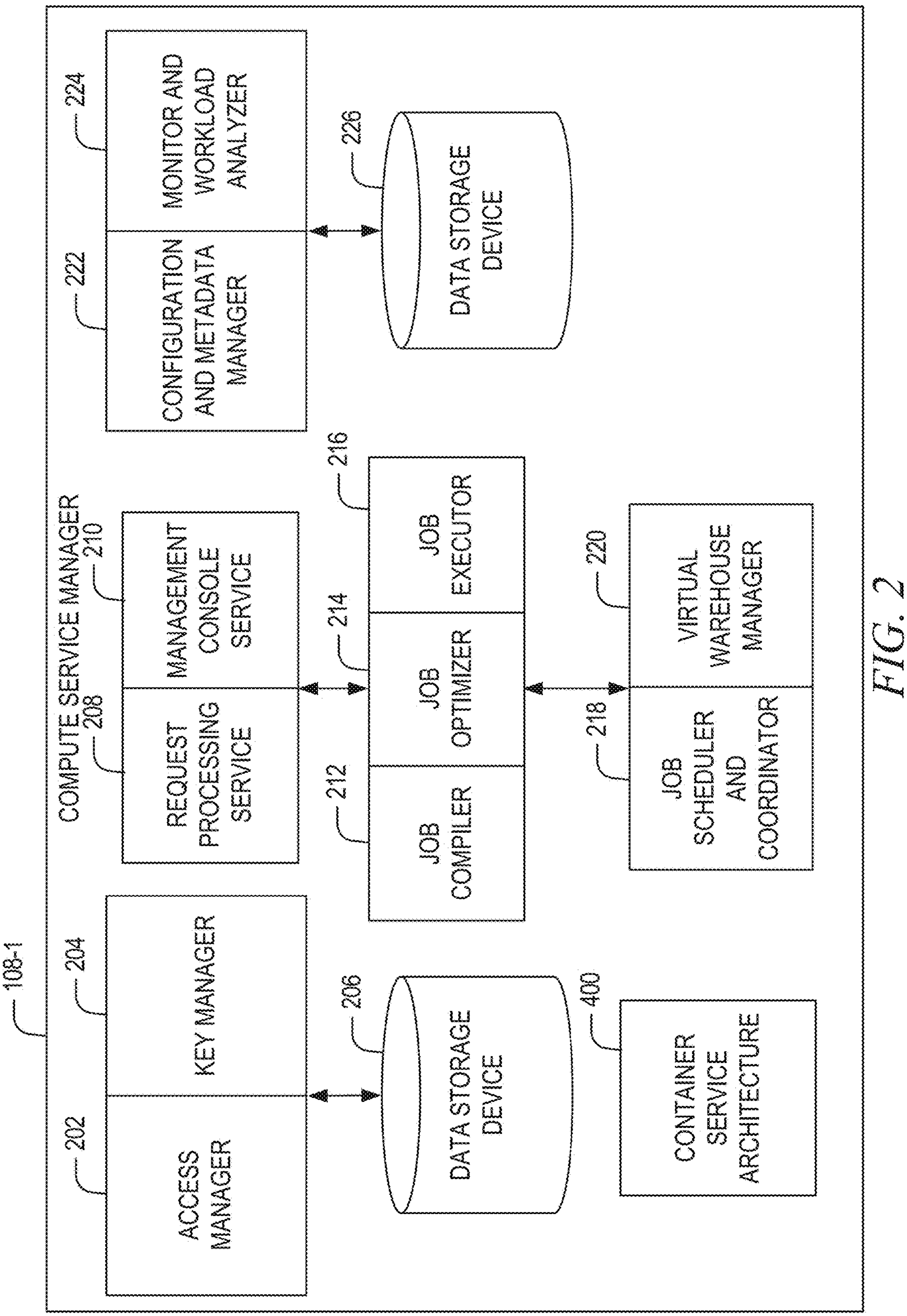
FIG. 2 is a block diagram illustrating components of a compute service manager, in accordance with some embodiments of the present disclosure.

FIG. 2 is a block diagram illustrating components of the compute service manager 108-1, in accordance with some embodiments of the present disclosure. As shown in FIG. 2, the compute service manager 108-1 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in storage platform 104-1). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110-1 or in a data storage device in storage platform 104-1.

A management console service 210 supports access to various systems and processes by administrators and other system managers. Additionally, the management console service 210 may receive a request to execute a job and monitor the workload on the system.

The compute service manager 108-1 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108-1.

A job scheduler and coordinator 218 sends received jobs to the appropriate services or systems for compilation, optimization, and dispatch to the execution platform 110-1. For example, jobs may be prioritized and processed in that prioritized order. In an embodiment, the job scheduler and coordinator 218 determines a priority for internal jobs that are scheduled by the compute service manager 108-1 with other "outside" jobs such as user queries that may be scheduled by other systems in the database but may utilize the same processing resources in the execution platform 110-1. In some embodiments, the job scheduler and coordinator 218 identifies or assigns particular nodes in the execution platform 110-1 to process particular tasks. A virtual warehouse manager 220 manages the operation of multiple virtual warehouses implemented in the execution platform 110-1. As discussed below, each virtual warehouse includes multiple execution nodes that each include a cache and a processor.

Additionally, the compute service manager 108-1 includes a configuration and metadata manager 222, which manages the information related to the data stored in the remote data storage devices and in the local caches (e.g., the caches in execution platform 110-1). The configuration and metadata manager 222 uses the metadata to determine which data micro-partitions need to be accessed to retrieve data for processing a particular task or job. A monitor and workload analyzer 224 oversee processes performed by the compute service manager 108-1 and manages the distribution of tasks (e.g., workload) across the virtual warehouses and execution nodes in the execution platform 110-1. The monitor and workload analyzer 224 also redistribute tasks, as needed, based on changing workloads throughout the network-based database system 102 and may further redistribute tasks based on a user (e.g., "external") query workload that may also be processed by the execution platform 110-1. The configuration and metadata manager 222 and the monitor and workload analyzer 224 are coupled to a data storage device 226. Data storage device 226 in FIG. 2 represent any data storage device within the network-based database system 102. For example, data storage device 226 may represent caches in execution platform 110-1, storage devices in storage platform 104-1, or any other storage device.

In an example, a large source table may be (logically) organized as a set of regions in which each region can be further organized into a set of micro-partitions. Additionally, each micro-partition can be stored as a respective file in the subject system in an embodiment. Thus, the term "file" (or "data file") as mentioned herein can refer to a micro-partition or object for storing data in a storage device or storage platform (e.g., at least one storage platform from storage platforms 104-1 to 104-N). In embodiments herein, each file includes data, which can be further compressed (e.g., using an appropriate data compression algorithm or technique) to reduce a respective size of such a file. For example, as discussed further herein, due to fragmentation, some data corresponding to a set of rows in a given file may be empty or sparsely populated, and compression of such rows can yield a smaller size of the file.

In some instances, fragmentation can occur at a table level where data (e.g., corresponding to a set of rows in a given source table) are stored across different micro-partitions or files associated with a given table. In comparison, when there is no fragmentation (or a low amount of fragmentation), the same set of rows are stored in a same partition or file associated with the table. It is appreciated that even in a source table with low fragmentation (e.g., based on a threshold number of rows), there can be multiple files associated with the table. Consolidated rows may also not be stored in one file, and can be stored in fewer files than where such rows were stored prior to consolidation.

In other examples, over time, modifying data can cause data fragmentation where files (or micro-partitions) are undersized or sparsely populated. As mentioned herein, each partition can correspond to a set of rows in a given source table, and a fragmented partition refers to a particular partition with one or more rows that are empty such that the source table is not as populated with data.

In some embodiments, metadata may be generated when changes are made to one or more source table(s) using a data manipulation language (DML), where such changes can be made by way of a DML statement. Examples of modifying data, using a given DML statement, may include updating, changing, merging, inserting, and deleting data into a source table(s), file(s), or micro-partition(s). Also, when multiple tables are selected from (e.g., as part of a DML statement) into another table, the target table of such a DML statement could suffer from fragmentation.

Although the above discussion and examples are related to compute service manager 108-1, in some embodiments, similar or the same components are included in each of the compute service managers shown in FIG. 1.

As further illustrated, compute service manager 108-1 includes a container service architecture 400. The container service architecture 400 is described in more detail in FIG. 4 below.

Figure 3:
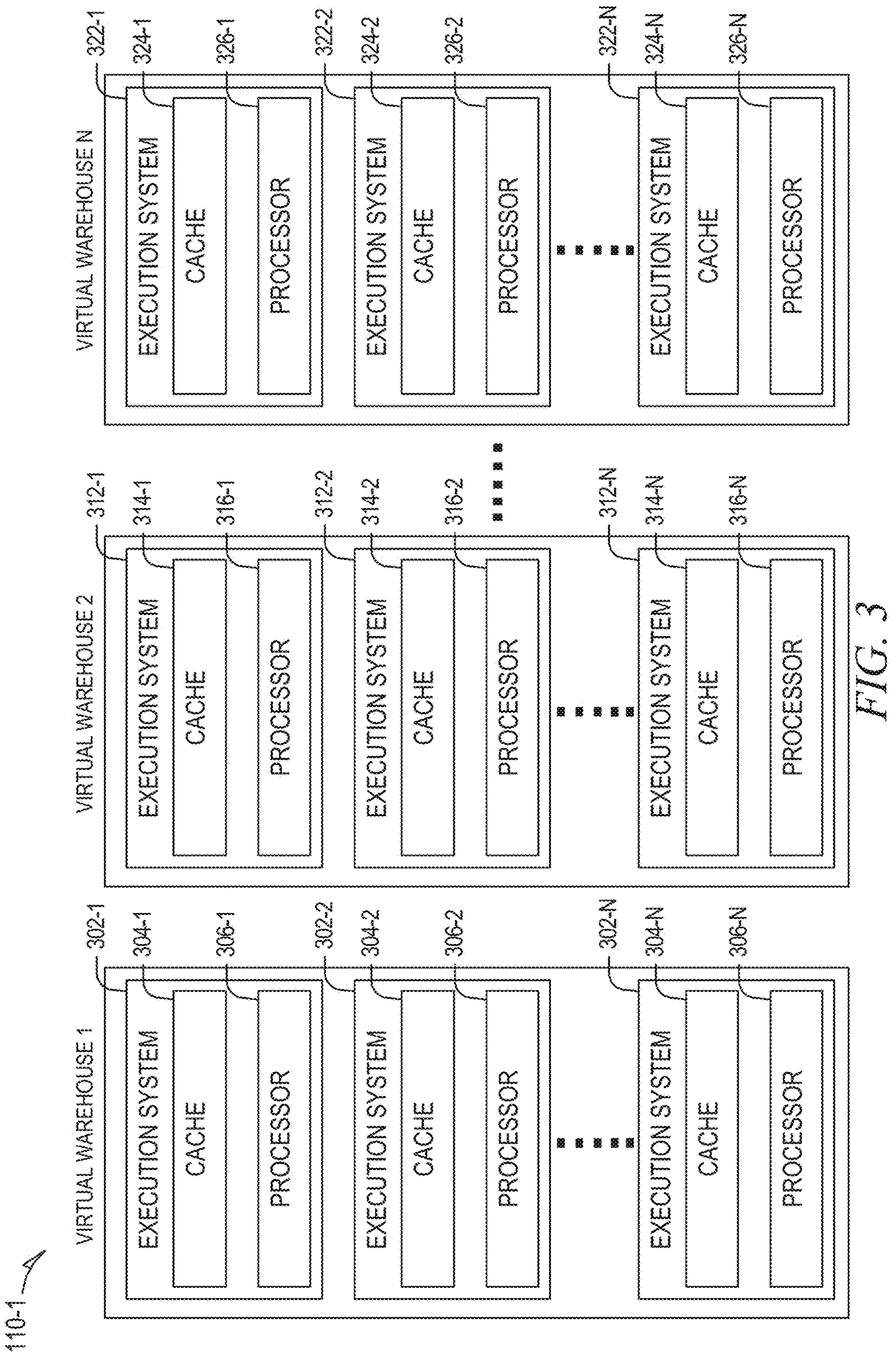
FIG. 3 is a block diagram illustrating components of an execution platform, in accordance with some embodiments of the present disclosure.

FIG. 3 is a block diagram illustrating components of the execution platform 110-1, in accordance with some embodiments of the present disclosure. As shown in FIG. 3, the execution platform 110-1 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 110-1 can add new virtual warehouses and drop existing virtual warehouses in real-time based on the current processing needs of the systems and users. This flexibility allows the execution platform 110-1 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 106-1 to 106-N shown in FIG. 1. Thus, the virtual warehouses are not necessarily assigned to a specific data storage device 106-1 to 106-N and, instead, can access data from any of the data storage devices 106-1 to 106-N within the storage platform 104. Similarly, each of the execution nodes shown in FIG. 3 can access data from any of the data storage devices 106-1 to 106-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110-1, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110-1 is also fault tolerant. For example, if one virtual warehouse fails, that virtual warehouse is quickly replaced with a different virtual warehouse at a different geographic location.

A particular execution platform 110-1 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Although the above discussion and examples are related to execution platform 110-1, in some embodiments, similar or the same components are included in each of the execution platforms shown in FIG. 1.

Embodiments of the subject technology provide container services that enable a fully managed container execution offering within the subject system, designed to facilitate the deployment, management, and scaling of containerized data-processing applications. In an example, users can provide their own containers for execution. SQL (e.g., various database statements that are to be executed) can pass data into applications, and the subject system treats scheduling and scaling the container execution as part of the query execution planning. Applications can execute SQL and embodiments described herein can simplify deployment of applications that process data stored in the subject system by streamlining integration and access. Existing task/query scheduling systems within the subject system can now leverage the new capabilities provided by scheduling container execution or passing data through running containers. Containers can be used to extend the subject database system in ways that are challenging to capture with traditional data extension mechanisms (e.g., user defined functions (UDF), and the like).

In comparison with virtualization platforms where virtual machines (e.g., virtualizing an entire machine or hardware architecture) may be utilized for performing tasks, the container service(s) as enabled herein offers a more lightweight approach by virtualizing, in an example, a given operating system (instead of the entire hardware architecture underneath). Consequently, the container service(s) described herein offers a more advantageous approach as containers are more lightweight compared to virtual machines, and are easier to manage and start for performing tasks (e.g., executing SQL statements, and the like).

As mentioned herein, a container image refers to an executable package that contains data, source code, libraries, dependencies, tools, and other files for an application to execute). The following discussion relates to various terms and phrases that may be utilized herein to describe aspects of the subject system.

A container service, as mentioned here, refers to a long-running service implemented by a set of horizontally scalable containers that handles network requests (from SQL or elsewhere) and returns appropriate results. In another example, a given container service can perform work (e.g., a set of operations) based on a timer (e.g., periodic), or could be initiating a request (e.g., polling for work from a database (e.g., SQL statement(s)) or elsewhere). As mentioned below, a given container service can provide or execute other services or jobs.

A container job service, as mentioned here, is some container-based code that performs some actions and runs to completion. A container job service can spawn child jobs and child services, which are scoped to the lifetime of the parent job. A job is implemented by a single instance (e.g., single container) in one example.

A container service class, as mentioned here, is conceptually a factory to instantiate services or jobs for a container service. In an example, container service classes define a public interface for interacting with the service, and also define a versioning and upgrade mechanism. Also, a container service class specifically references the container images which implement a version.

A compute pool, as mentioned here, is similar to a virtual warehouse and represents the compute environment in which services and jobs provided by a container service are run. In an example, a compute pool defines a pool of instances (e.g., compute nodes) with some set of hardware specifications. A given compute pool meets two requirements: 1) providing control of hardware capabilities, and 2) limiting a scale of deployed resources. As referred to herein, in an example, a compute node refers to a server or a virtual machine that provides computational resources, and an example of such may be the aforementioned execution node(s). For example, a given compute node may include processing capabilities (e.g., CPU(s), and the like), memory, storage, and networking resources.

Multiple services may run on a compute pool. Depending on service resource requirement specification, multiple services may run on any given instance of a compute pool.

A container service function, as mentioned here, is a SQL interface that a container service can expose. A service function provides a (convenient) mechanism for calling into services from SQL, provides data to be processed, and integrates results into SQL query processing.

A container job service can optionally define endpoints that can be invoked during the lifetime of that container service. However, it is appreciated that it may not be typical for a given container job service to expose endpoint(s). Endpoints represent the exposed network port, as well as the rules governing access.

The following discussion relates to a (high level) system architecture and overview of container management and deployment performed by components of the below described system architecture.

Figure 4:
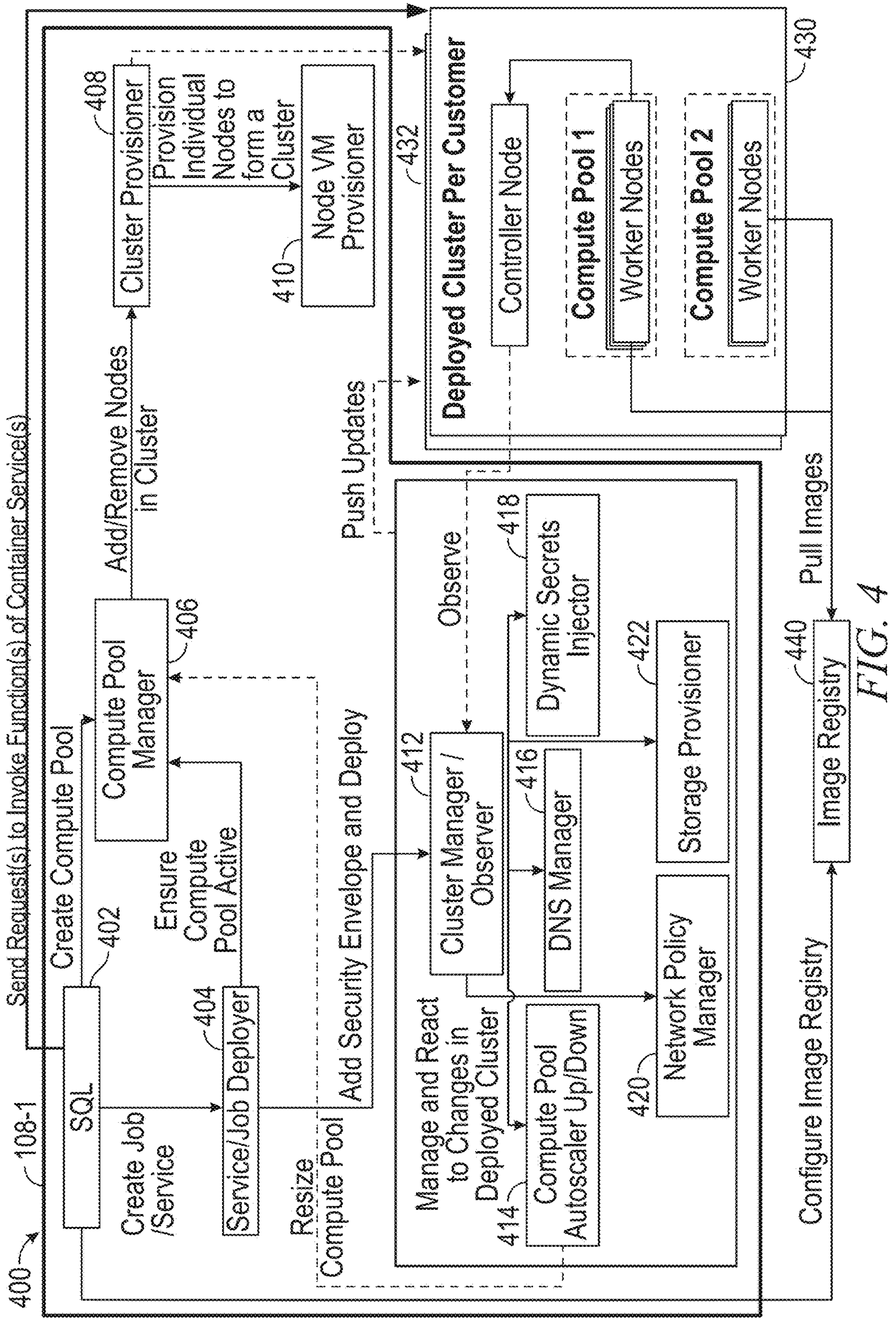
FIG. 4 is a block diagram depicting an example system architecture of a database system, in accordance with some embodiments of the present disclosure.

FIG. 4 is a block diagram depicting an example container service architecture 400 of a database system, in accordance with some embodiments of the present disclosure. As illustrated, container service architecture 400 includes components discussed before, including, for example, compute service manager 108-1. In FIG. 4, compute service manager 108-1 may include additional components that were not discussed in FIG. 2 above, and discussed further below in the context of FIG. 4. It is understood that a given instance of a compute service manager may include the components described previously in FIG. 2 and the components described below in the following discussion.

In the example of FIG. 4, compute service manager 108-1 includes components of SQL 402, service/job deployer 404, compute pool manager 406, cluster provisioner 408, node VM provisioner 410, cluster manager/observer 412, compute pool autoscaler up/down 414, DNS manager 416, dynamic secrets injector 418, network policy manager 420, storage provisioner 422, deployed cluster 430, deployed cluster 432, and image registry 440.

In an implementation, container service architecture 400 may be understood (e.g., in an abstracted manner) in the context of different layers where each layer performs various tasks. Each of these layers may include various components as discussed below. With respect to such layers, container service architecture 400 can include 1) an SQL/User Model layer, 2) a container orchestrator layer, 3) a cluster manager layer, and 4) a node provisioner layer.

In an embodiment, SQL/User Model layer manages compute pools and resources for services, including receiving SQL statements and dispatching such statements to various components as appropriate for processing. As shown, SQL 402 represents a set of SQL statements which are received by the subject system (e.g., provided by a user). SQL 402 may include various commands or operations that are to be performed by compute pool manager 406, service/job deployer 404, or image registry 440. In an example, such operations include 1) creating a compute pool (e.g., sent to and processed by compute pool manager 406), 2), creating a job or a service (e.g., sent to processed by service/job deployer 404) and 3) configuring an image registry (e.g., creating and managing image registry 440), among other types of operations.

As mentioned above, a request (e.g., SQL statement(s) from SQL 402) to create a compute pool can be sent to compute pool manager 406. After receiving the request, compute pool manager 406 can create the requested compute pool, which may, as shown, include sending a request to cluster provisioner 408 to perform operation(s) to create the compute pool. In an example, to create the request compute pool, cluster provisioner 408 sends a request to provision individual nodes to form a cluster (e.g., deployed cluster 430 or deployed cluster 432) to node VM provisioner 410. Node VM provisioner 410 can then perform operation(s) to provision the requested nodes to form the cluster.

As shown, after receiving a request to create a job or service, service/job deployer 404 ensures that a compute pool (e.g., as specified in such a request) is active by sending a request to compute pool manager 406. As also shown, service/job deployer 404 can send a request to add a security envelope and deploy the job or service to cluster manager/observer 412. After receiving the request, cluster manager/observer 412 deploys the job or service to a particular compute pool (e.g., as specified in the request).

In an embodiment, SQL 402 includes a set of statements to invoke a function that is provided by a particular container service (further details are discussed below), which are sent to a deployed cluster (e.g., based on a specified compute pool in the set of statements, and the like) for execution by a particular compute pool.

In an embodiment, a container orchestrator layer manages clusters per account, manages nodes in compute pools, secures and deploys container resources, and auto-scales resources and compute pools. A container orchestrator layer includes the aforementioned compute pool manager 406, service/job deployer 404, image registry 440, and also cluster manager/observer 412, compute pool autoscaler up/down 414, DNS manager 416, dynamic secrets injector 418, network policy manager 420, and storage provisioner 422.

Cluster manager/observer 412 observes changes to containers executing within deployed cluster 430 (or deployed cluster 432), and responds to such changes in a given deployed cluster. Cluster manager/observer 412 pushes configurations, manages DNS entries, injects secrets, provisions storage, autoscales compute pools, and manages network policies. Based on the observed changes, cluster manager/observer 412 pushes such updates to deployed cluster 430 (or deployed cluster 432).

As illustrated, cluster manager/observer 412 communicates with additional components of compute pool autoscaler up/down 414, DNS manager 416, dynamic secrets injector 418, network policy manager 420, and storage provisioner 422, each of which providing the aforementioned functionality where appropriate. In an example, dynamic secrets injector 418 pushes secrets that the worker nodes may need to communicate with image registry 440.

In the context of computer security, a "secret' can refer to confidential information that is used to protect secure communications, authenticate identities, or grant access to resources. Secrets can include passwords, encryption keys, tokens, and other forms of credentials that are used to verify the identity of users, systems, or entities, and to ensure that only authorized parties can access sensitive data or perform certain actions. Such secrets as described herein, enable worker nodes in a particular deployed cluster to interact (e.g., pull images, perform operations, and the like) with image registry 440. In addition, secrets can be utilized in executing SQL from a service, and also for services to use when interacting with other resources or components irrespective of whether they are provided internally as part of the subject system or externally (e.g., third party, and the like) from the subject system. Moreover, secrets can be login credentials for a third party API on the Internet that a given service calls out to (e.g., invokes API calls to the third party API).

As shown, compute pool autoscaler up/down 414 can send a request to compute pool manager 406 to resize a particular compute pool. After receiving such a request, compute pool manager 406 sends a request to cluster provisioner 408 to either add or remove worker nodes from the compute pool.

In an embodiment, a cluster manager layer includes cluster provisioner 408. The cluster manager layer, including cluster provisioner 408, manages deployment of workers and controllers in per-account clusters in an example. As shown, architecture 400 includes deployed cluster 430 and deployed cluster 432, each which were provisioned by cluster provisioner 408. Although two different deployed clusters are shown in FIG. 4, it is appreciated that any number of deployed clusters may be included in architecture 400.

In an embodiment, cluster provisioner 408 communicates with a node provisioner layer that includes node VM provisioner 410. In an example, VM provisioner 410 provisions controller and worker VMs from cloud providers.

Each of deployed cluster 430 and deployed cluster 432 is associated with a particular customer (e.g., user account or client account), and each of the deployed clusters include a number of compute pools. As further shown, each compute pool includes a number of worker nodes. Worker nodes from each compute pool communicate with a controller node that sends updates to cluster manager/observer 412. As discussed above, cluster manager/observer 412 can push updates to each deployed cluster, which in an example, may be received by the controller node of the deployed cluster, or received directly by a worker node(s) of a particular compute pool from the deployed cluster. Moreover, such worker nodes pull images from image registry 440 as further shown. In an example, image registry 440 stores container images.

Embodiments of the subject technology allow existing database administrators to leverage their existing RBAC and network controls to manage the risks of hosting compute containers. Data security is a critical concern. Having different systems for managing in/out network access in different ways for existing data analytical systems versus (new) compute containers could create a significant security and operating risk. The subject technology implements access controls for container services. For example, services run as a set of roles, and in/out access is granted as a permission for a given role against a target. A peer-to-peer network access is controlled by using a usage permission on the peer service. Access to a service from outside the subject system requires authentication and passing a RBAC check as discussed further herein.

As mentioned above, the primary benefit is a single, coherent set of controls that apply both to existing data analytic services and compute services. This enables existing security and audit processes that originated to mitigate business risks associated with access to data, can be easily applied to compute services, without expensive retraining of the customer's administrative and risk analysis capabilities.

The following discussion relates to a (high level) system architecture and overview of container management and deployment performed by components of the below described system architecture. More specifically, the below discussion relates to different aspects of the described architecture:

1) between a user(s) and network database system
2) between a first service and a second service (both within container services cluster shown in FIG. 5)
3) between a user container (e.g., within container services cluster) and network database system Role-Based Access Control (RBAC) in the context of a database (e.g., the network-based database system 102) can be understood as a security mechanism that restricts access to database resources based on the roles assigned to individual users, or queries/processes/services operating on behalf of a user(s), within an organization. Instead of giving permissions to each user directly, roles are created to represent a set of permissions that correspond to the responsibilities and functions within the organization.

In an example, RBAC can be implemented within the network-based database system 102 using at least the following:

Roles: These are defined within the database management system and represent a collection of permissions. For example, a role could be 'DatabaseAdmin' or 'ReadOnlyUser'. As mentioned further below, a role may indicate ownership of a particular database object(s).

Permissions: These are specific privileges that allow a user to perform certain actions on the database, such as SELECT, INSERT, UPDATE, DELETE, or EXECUTE permissions on tables, views, stored procedures, and other database objects. As discussed below, other privileges may relate to operation(s) that are permitted to be performed in the context of container services or compute pools. Each role may be associated with a set of permissions (e.g., one or more privileges, and the like).

Users: Individuals who need access to the database are assigned one or more roles rather than individual permissions.

Groups: In some systems, users can be grouped, and roles can be assigned to groups instead of or in addition to individual users.

Access Control: When a user attempts to access the database, the system checks the roles assigned to the user to determine if the action is permitted.

Figure 5:
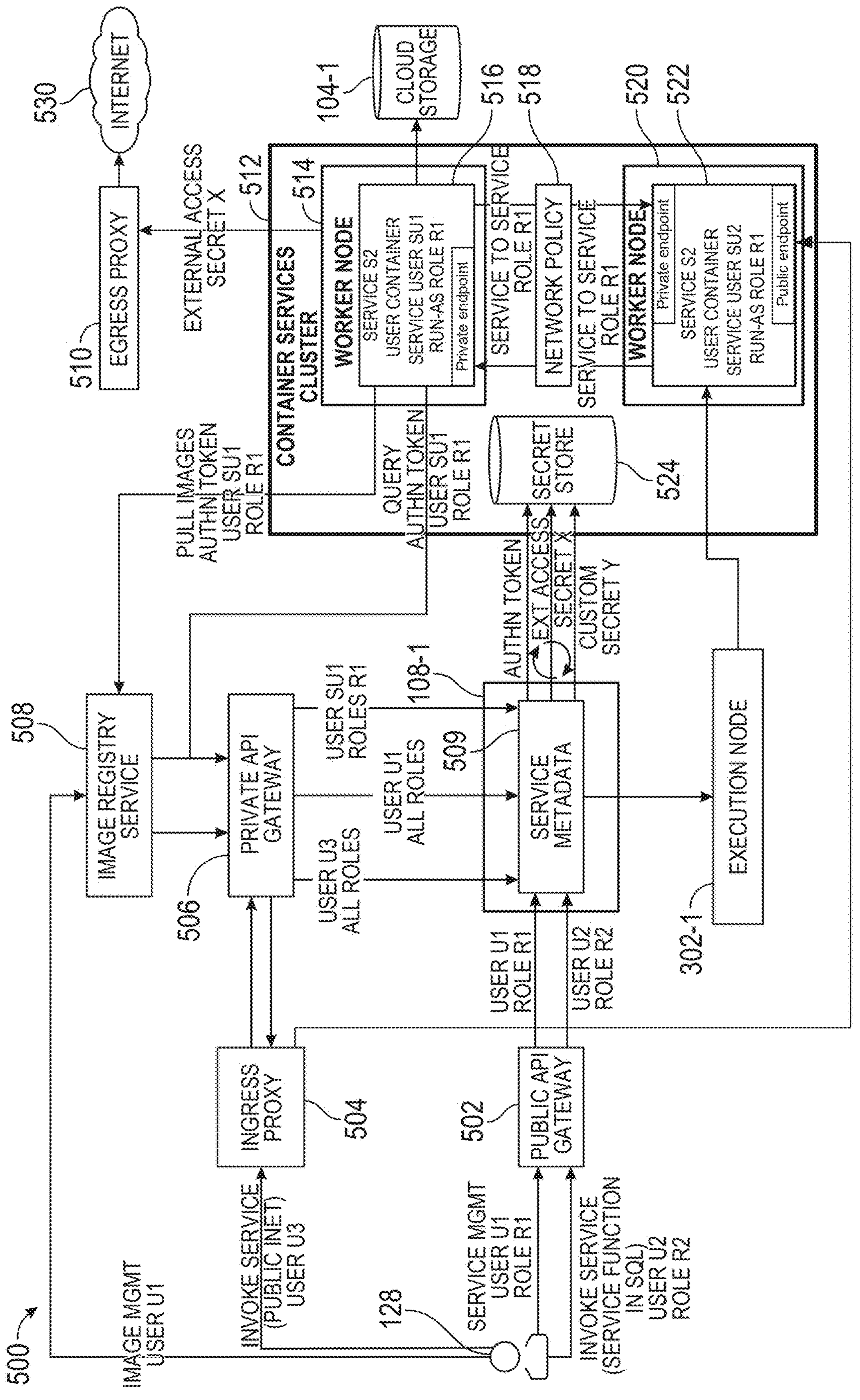
FIG. 5 is a block diagram depicting another example system architecture, in accordance with some embodiments of the present disclosure.

FIG. 5 is a block diagram depicting an example container service architecture 500 of a database system, in accordance with some embodiments of the present disclosure. As illustrated, container service architecture 500 includes components discussed before, including, for example, compute service manager 108-1. In FIG. 5, compute service manager 108-1 may include additional components that were not discussed in FIG. 2 or FIG. 4 above, and discussed further below in the context of FIG. 5. It is understood that a given instance of a compute service manager may include the components described previously in FIG. 2 or FIG. 4 and the components described below in the following discussion. Moreover, architecture 500 can be understood as an extension of the architecture described in FIG. 4 and incorporate similar components (or the same components) as described in FIG. 4). However, it is also understood that in some implementations, architecture 500 can include fewer components than those described before in FIG. 4.

In the example of FIG. 5, architecture 500 includes private API gateway 506, compute service manager 108-1, and execution nodes 302-1, each of which are provided by network-based database system 102. As shown, architecture 500 includes image registry service 508, egress proxy 510. In an embodiment, at least some components of architecture 500 may be included as part of network-based database system 102, or alternatively, some components of architecture 500 may be separate from network-based database system 102. Container services cluster 512 includes worker node 514 and worker node 520. Worker node 514 includes container service 516 and worker node 520 includes container service 522. Container service 516 includes a service (e.g., service S2) and container service 522 includes a service (e.g., service S2). Container services cluster 512 also includes a secret store 524.

With respect to interactions between a user (e.g., corresponding to a client such as client account 128 associated with user device 112) and the network-based database system 102, client account 128 can perform various operations. In the example of FIG. 5, it is appreciated that more than a single user can be associated with client account 128 such that multiple (different) users are supported by client account 128.

As illustrated, client account 128 can send a request(s) to image registry service 508. In an example, client account 128 can log onto image registry service 508 using a set of credentials where the credential can be the same credentials utilized to access the network-based database system 102. After logging on, client account 128 can send requests to image registry service 508 to manage container images such as pulling such images, and then pushing the images for deployment to container services cluster 512. Other operations can be performed such as inspecting images provided by image registry service 508, among other types of operations.

In an implementation, image registry service 508 includes an authentication component that communicates with network-based database system 102 and performs authentication and authorization check(s) to enable RBAC. In particular, image registry service 508 communicates with private API gateway 506 where compute service manager 108-1 performs the authentication and authorization check(s).

As shown, a user of client account 128 sends a request to ingress proxy 504 to create a container service. In an example, such a request may include a set of statements to deploy a container based on a container service specification indicated in the set of statements. The container service specification ("service specification") can include information to create service endpoints and roles. In an embodiment, during creation of the container service, the following can occur:

In an example, the lifecycle of the endpoint will be tightly coupled with that of the service and can behave as follows:

- Service is created: new objects will be created for all endpoints defined in the service specification.
- Service is updated: new objects will be created for the new endpoints added to the service specification. Additionally, the objects corresponding to the endpoints removed from the service specification will be deleted.
- Service is deleted: all the endpoints will be deleted.

Moreover, during creation of the container service, roles can be created as indicated in the container specification, which defines a list of roles associated with the service as well as the list of endpoints each role can access.

In an embodiment, users cannot grant privileges to a service-scoped role outside of the service. Service roles are defined by a service specification and have a lifecycle tied to the service. A service-scoped role is used to hold the privileges for the endpoints defined in the service specification, and can behave in accordance to the following:

- Service is created: new objects will be created for all the roles defined in the service specification and the roles will be granted usage privileges for the endpoints.
- Service is updated: new objects will be created for the new roles defined in the service specification, and the objects corresponding to the roles removed from the service specification will be deleted.
- Service is deleted: all the roles will be deleted.

In addition, after the service has been created, the service owner, or account administrator, can grant the service role to the appropriate role using a corresponding SQL command (e.g., particular SQL statement(s)), and users can revoke the service-scoped role from the assigned role using an appropriate SQL command. In an example, granting or revoking a service role allows or disallows the grantee role to access the service endpoint through any of the following: 1) ingress proxy, 2) SQL functions, or 3) service to service communication. A "service endpoint" can refer to a port or network port as mentioned herein. Moreover, users can see the list of roles associated with the service using a particular SQL command. Further, users can view the grants provided to the service-scoped role using a specific SQL command.

In an example, after the user of client account 128 creates a service (e.g., instantiated in container services cluster 512), an ingress endpoint can be publicly exposed to provide access to the service. For example, DNS records for the service can be generated and subsequently stored in service metadata 509. Login requests (or other requests) from client account 128 (e.g., from different users) can be forwarded, by ingress proxy 504 using such DNS records, to access the service of container services cluster 512.

Moreover, ingress proxy 504, in an implementation, includes an authentication component that communicates with network-based database system 102 (e.g., via private API gateway 506) where compute service manager 108-1 performs authentication and authorization check(s) to enable RBAC. In an implementation, private API gateway 506 is a private load balancer component. As discussed further below, using the information related to role(s) from service metadata 509, compute service manager 108-1 can perform checks to enable and enforce RBAC throughout architecture 500.

In an implementation, one privilege of RBAC includes access to a public endpoint exposed by a service. Thus, only user(s) that include a role with this privilege may access the public endpoint of the service. In FIG. 5, container service 522 is an example of a component that includes a public endpoint and a private endpoint, and container service 516 is an example of a component that includes a private endpoint. In an example, each of the aforementioned endpoints can correspond to different network ports (or ranges of network ports) related to its corresponding container service. In an implementation, public API gateway 502 is a public load balancer component. Moreover, it is appreciated that in some implementations, public API gateway 502 is not included in architecture 500 such that client account 128 sends requests directly to compute service manager 108-1. Similarly, in some implementations, private API gateway 506 is not included in architecture 500, and requests can be sent directly to compute service manager 108-1.

Users, by using a client or appropriate UI, can manage objects associated with container services, image registry service 508, compute pools (e.g., as discussed in FIG. 4), and jobs. Such users can manage properties associated with any of the aforementioned objects in which each object has a set of permissions under RBAC to perform particular operation(s). In an example, to alter settings associated with a service, a given object performing such operations is required to be an owner (e.g., owner role) of the service. To suspend or resume a service, an object performing such an operation must have an operate privilege on the service. Similarly, for suspending, resuming, and scaling a given compute pool, an object must have an appropriate set of privileges for performing such operation(s) on the compute pool. As mentioned before, authentication and authorization checks are performed by compute service manager 108-1. As shown, a request to manage an object(s) associated with a container service can be sent by a user (with a given role(s)) to public API gateway 502 where the request is forwarded to compute service manager 108-1 to perform authentication and authorization checks with respect to the request.

In an example, a container service can also be publicly exposed by enabling invocation of one or more SQL functions (e.g., by submitting through SQL queries that are processed by compute service manager 108-1 or execution node 302-1 (or other components of network-based database system 102). Such functions also undergo RBAC checks to ensure that a given user(s) have a role or privilege to invoke such functions and also have a role or privilege to use a particular (public) endpoint. As shown, a user of client account 128 invokes a function in SQL and sends a request (e.g., a set of SQL statements) to public API gateway 502, which forwards the request to compute service manager 108-1 to perform authentication and authorization checks for RBAC by using at least information stored in service metadata 509. When a role associated with the user passes the RBAC checks, the request(s) with the SQL statement(s) can be forwarded to execution node 302-1 for processing, which in turn sends the request to the container service (e.g., container service 522) to invoke the function(s) based on the SQL statement(s).

It is appreciated that different components in architecture 500 can require different RBAC roles or permissions. Enforcement of such RBAC roles or permissions, again, is performed by compute service manager 108-1.

For communication between different container services, as shown, container service 522 can send, using network policy 518 (e.g., storing a set of firewall rules based on TCP), request(s) to container service 516. In a similar manner, container service 516 can send, using network policy 518, request(s) to container service 522. By way of example, a first container service can open a connection to another container service using the set of firewall rules from network policy 518 (discussed further below in the example of FIG. 6).

As further shown, compute service manager 108-1 provides an authentication token, external access secret, and custom secret for storage on secret store 524 in container services cluster 512. In an example, the authentication token is utilized for communication between components of network-based database system 102 and components of container services cluster 512 (e.g., various container services). The authentication token is pushed to a container service(s) in container services cluster 512 so that the container service can provide the authentication token when in communication with components of network-based database system 102. The authentication token does not represent any "real" user identity and is utilized to ensure that proper role(s) and permissions are associated with a user(s) making requests between the service container and components of the network-based database system 102 including private API gateway 506, and image registry service 508.

In an example, container service 516 utilizes an authentication token to perform operations such as pulling images from image registry service 508, or running a query in the database system provided by components such as execution node 302-1.

The external access secret is for accessing external endpoints, and can be in the form of a set of credentials (e.g., for logging into an external endpoint). The external access secret, as shown, is deployed to secret store 524 to enable a container service to access an external endpoint(s). In architecture 500, such external endpoints can include egress proxy 510, and storage platform 104-1 (e.g., cloud storage). As further shown, egress proxy 510 can communicate to an external network 530 (e.g., the Internet). It is noted that roles and RBAC are utilized to constrain the egress of data throughout the subject system, such as constraining the egress of data from a given container service (e.g., container service 516) to, for example, storage platform 104-1.

The custom secret can include sensitive or other confidential information that are provided for storing in secret store 524, which can subsequently be provided to a container service without requiring such sensitive information to be explicitly indicated in a specification of a container service. In an implementation, a specification of a container service is stored in service metadata 509, and a custom secret associated with such a specification can be stored separately in secret store 524 for additional security. Further, the container service only has access to the custom secret (e.g., stored in secret store 524) that is included in its associated specification.

Thus, architecture 500 can be understood that providing a platform as a service (PaaS) where boundaries (initially) constrain a user by a service, and where architecture 500 provides various mechanisms to open up such boundaries. Platform as a Service (PaaS) refers to a cloud computing platform that allows users to develop, run, and manage applications without the complexity of building and maintaining the infrastructure associated with developing and launching an app.

Figure 6:
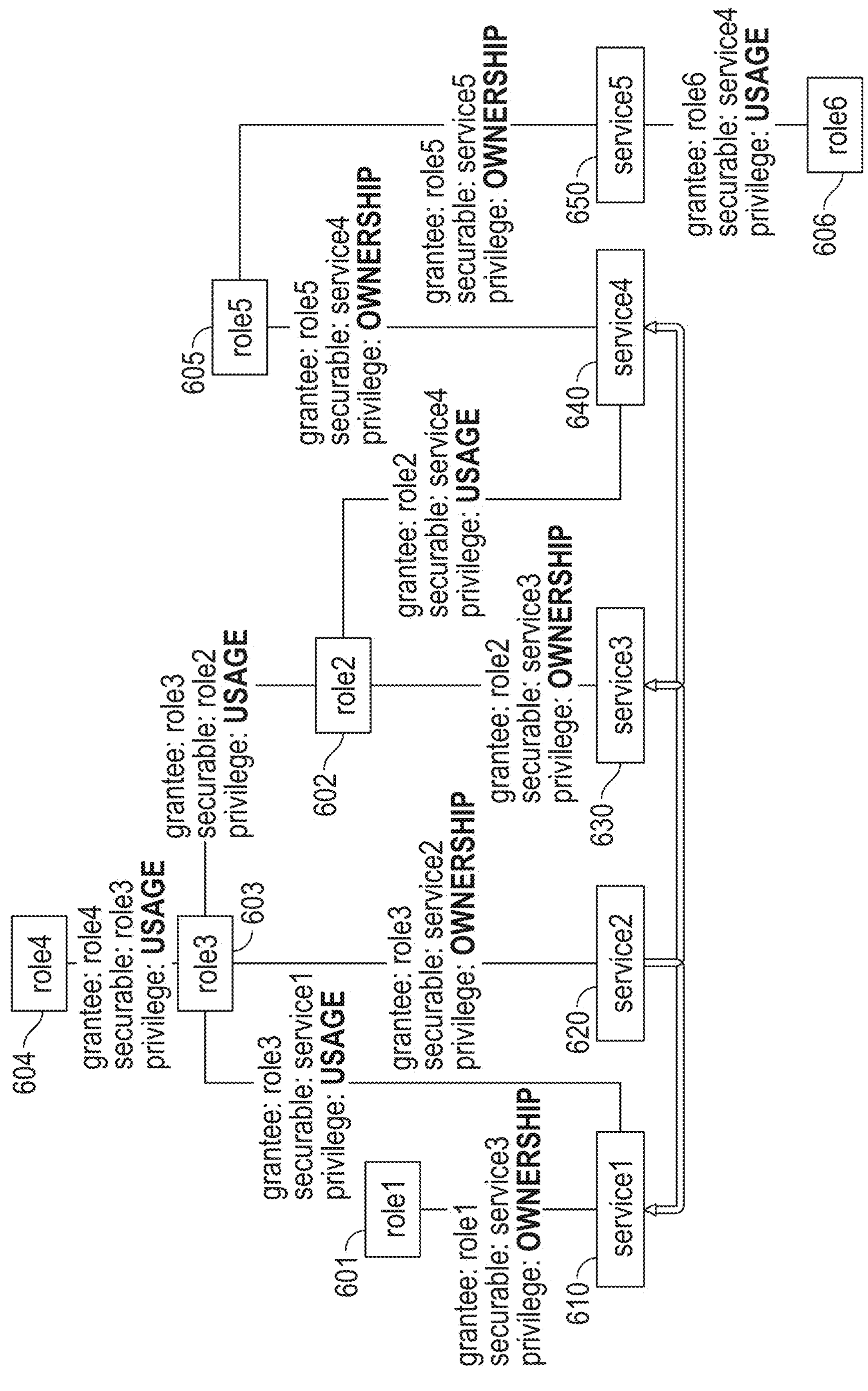
FIG. 6 illustrates an example of a hierarchical structure of a set of roles, in accordance with an embodiment of the subject technology.

FIG. 6 illustrates an example of a hierarchical structure of a set of roles, in accordance with an embodiment of the subject technology.

In the example of FIG. 6, a set of roles including role 601, role 602, role 603, role 604, role 605, and role 606 are shown. Any role can be a grantee of another role. For example, role 604 is a grantee of role 603. In addition, each role can be assigned to one or more services. FIG. 6 further includes service 610, service 620, service 630, service 640, and service 650.

The set of roles and services in FIG. 6 can be represented as a graph, where edges have properties. This graph can be stored in a particular database object as a list of edges based on the following:

grantee: role4,securable: role3,privilege: USAGE
grantee: role3,securable: service1,privilege: USAGE
grantee: role1,securable: service3,privilege: OWNERSHIP
grantee: role3,securable: service2,privilege: OWNERSHIP
grantee: role3,securable: role2,privilege: USAGE
grantee: role2,securable: service3,privilege: OWNERSHIP
grantee: role2,securable: service4,privilege: USAGE
grantee: role5,securable: service4,privilege: OWNERSHIP
grantee: role5,securable: service5,privilege: OWNERSHIP
grantee: role6,securable: service5,privilege: USAGE In an example, role 603 can create service 620. After deployment, service 620 executes on behalf of role 603. As also shown, role 603 is a grantee of role 602, which is illustrated as having role 603 being a "parent" of role 602 (which is a "child" of role 603) in the hierarchical structure. As a grantee, role 603 also includes any privileges (e.g., permissions) that are associated with role 602, and role 603 can act on behalf of role 602. In this example, role 602 has an ownership privilege of service 630 (e.g., role 602 runs service 630), where role 603 also has the ownership privilege as a grantee of role 602. However, role 602, as a child of role 603, does not have any of the privileges that are directly associated with role 603.

For facilitating communication between different services shown in FIG. 6, a set of rules (e.g., firewall rules based on TCP network protocol that may correspond to network policy 518) may be generated based on the hierarchical structure of FIG. 6 such that the rules specify a service that opens a connection and a different service that accepts the connection. In FIG. 6, for example, service 620 can open a connection with service 630 and service 630 can accept the connection; however, service 630 could not open a connection with service 620 (e.g., such a connection is prohibited because role 602 is the child of role 603). Thus, a given role that is positioned higher in the hierarchy have broader access to other role(s) lower in the hierarchy, while another role positioned lower in the hierarchy would have stricter access to other role(s), and therefore such access is attributed to corresponding services of each role to determine whether a connection is permitted or not between different services.

Moreover, in an embodiment, the aforementioned set of rules may also grant access to specific network ports (e.g., service endpoints) per role where a given role may only have access to a particular network port(s) for a given container service.

In an implementation, the aforementioned set of rules are generated based on the hierarchy where the rules specify for each particular service which other services that the particular service can open a connection with, and also specify for each particular service which other services that connection can be accepted from that other service(s).

Moreover, it should be appreciated that any extensions to RBAC discussed herein are implemented in a way that is consistent with an existing RBAC framework. Such new capabilities are expressed using RBAC concepts by adding new operations and new targets (e.g., "securables").

Containerization refers to the use of containers to encapsulate, deploy, and manage applications along with their dependencies and configurations in a lightweight, portable, and standardized environment. Containerization is now a standard way to pack one's runtime environment along with code files and binaries to make sure they get a consistent runtime experience when running locally, in test environments, and in production. In one example, this is accomplished by building a layered filesystem that packs the exact directory and file structure which is reflected when running their code and creating an archive of this (which is often compressed). This archive is referred to as a container image (or simply "image" or "images" as referred to herein), which can be provided as a set of artifacts (e.g., layer blobs, manifests, index files, and the like) that, when combined, can be run as a container. Further, open container initiative (OCI) is a widely accepted standard for creating, discovering, and running images, which is supported by components of the subject system.

In order to run containers in some computing platforms, the images are uploaded and stored at a location(s) that is accessible to the image builder (e.g., user(s) associated with client account 128) and the service orchestrator (e.g., container service architecture 400). These locations are called container image registries and can implement the OCI distribution specification to enable OCI-compliant clients (e.g., Docker) to interact with them. Embodiments of the subject technology provide an image registry that is OCI-compliant, which is used by users in order to start containers on the subject system.

Such an image registry, as described further herein, enables users to bring sophisticated applications, such as data processing, visualization, ML, etc., right into their SQL database. Users can still use their database mechanisms for access control, encryption, storage management, garbage collection, disaster recovery, and replication of their code image artifacts, effectively allowing them to treat their code images like data.

As also discussed herein, embodiments of the subject technology pre-process images to make them faster to download and start by trimming their unnecessary parts and loading only the parts that are (initially) required to run a container. This can provide an additional advantage of running images faster when using the subject image registry with the subject system.

Figure 7:
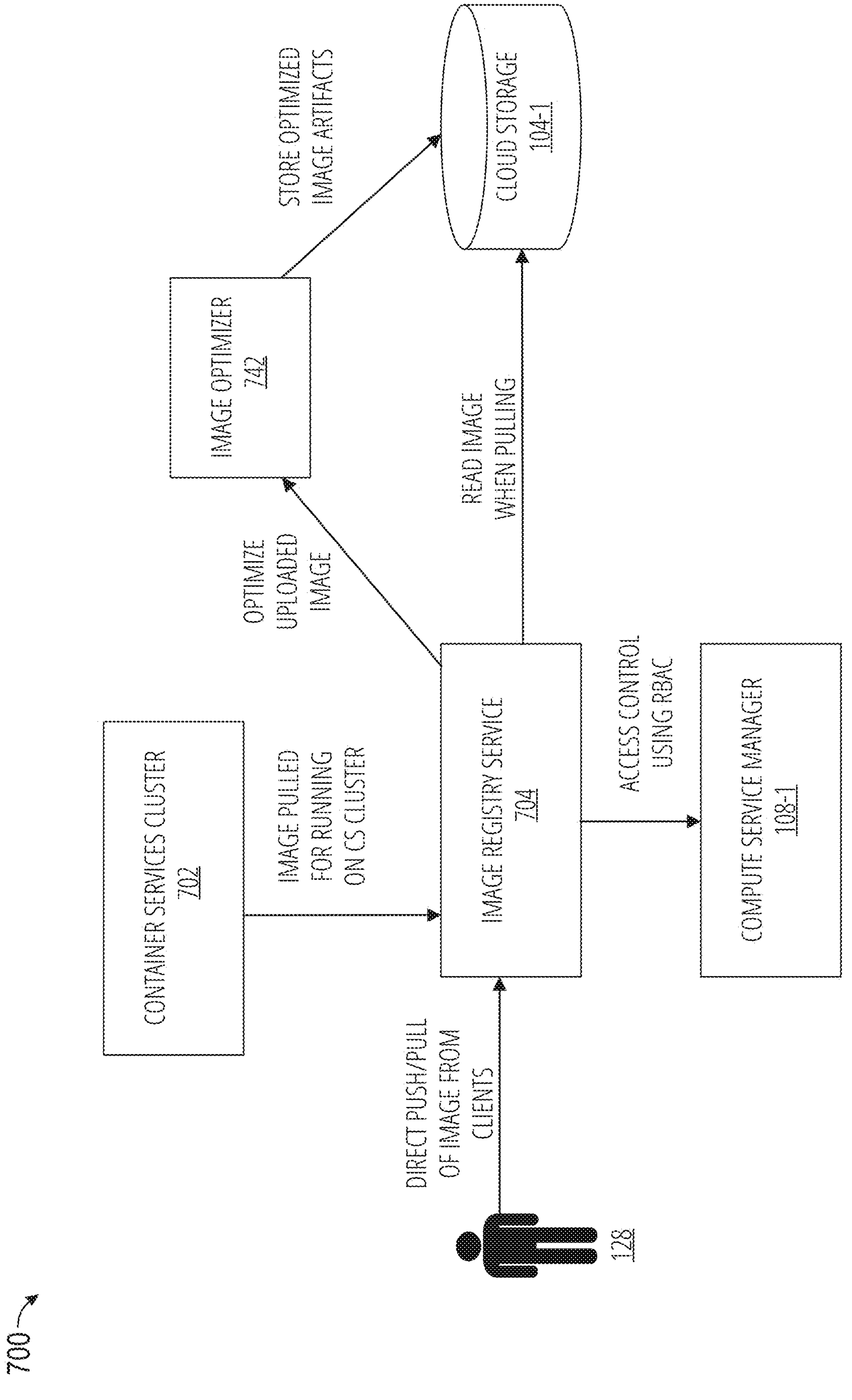
FIG. 7 illustrates an example of an architecture including an image registry service, in accordance with some embodiments of the subject technology.

FIG. 7 illustrates an example of an architecture 700 including an image registry service, in accordance with some embodiments of the subject technology.

In an implementation, image registry service 704 is a hosted HTTP service that runs within a cluster. The service exposes a fully OCI distribution spec-compliant API (e.g., OCI spec-compliant API) with additional APIs for listing artifacts, deletion, garbage collection, and the like. An OCI spec-compliant API refers to an Application Programming Interface (API) that adheres to the standards set by the Open Container Initiative (OCI) specifications, which are designed to ensure interoperability and consistency across different container technologies, enabling a standardized ecosystem for building, shipping, and running containers.

Users can call the service using an OCI-compliant client (e.g., Docker CLI, and the like). All requests to the service are access-controlled using RBAC as discussed elsewhere herein. The destination of the images is a special kind of stage (e.g., a location where data files are stored (staged) for loading and unloading data) called an image repository, which can be understood as a top-level object in an image registry that acts as a namespace for container images. Such an image registry refers to a web service that implements one or more OCI-compliant API(s). Users create image repositories using SQL, which provides a URL (uniform resource locator) for sending images. Such repositories are access-controlled using RBAC for read and write operations.

As illustrated, architecture 700 includes components discussed before, including, for example, compute service manager 108-1. It is understood that a given instance of a compute service manager may include the components described previously in FIG. 2, FIG. 4, and FIG. 5. Moreover, architecture 700 can be understood as an extension of the respective architecture described in FIG. 4 or FIG. 5, and incorporates similar components (or the same components) as described in FIG. 4 or FIG. 5). However, it is also understood that in some implementations, architecture 500 can include fewer components than those described before in FIG. 4 or FIG. 5.

In the example of FIG. 7, architecture 700 includes container services cluster 702, image registry service 704, compute service manager 108-1, and image optimizer 742, each of which are provided by network-based database system 102. In an embodiment, at least some components of architecture 500 may be included as part of network-based database system 102, or alternatively, some components of architecture 500 may be separate from network-based database system 102.

As illustrated, one or more users associated with client account 128 can perform, using an OCI-compliant client, operations including pushing and pulling images to and from image registry service 704. In an example, such operations are called by a user of client account 128 using corresponding API calls from an OCI spec-compliant API (e.g., invoked using an OCI client), which are sent to image registry service 704 for processing. Prior to processing any API calls (or requests), image registry service 704 communicates with compute service manager 108-1 to determine whether a requesting user (or container services cluster) has sufficient permission to perform such an operation(s). In an example, compute service manager 108-1 applies access-control using RBAC to all requests to image registry service 704 to ensure that any requesting user has sufficient permission to perform such an operation(s).

When access-control check(s) have passed, the following can be performed. After receiving a pushed image from the user of client account 128, image registry service 704 stores the image on cloud storage 104-1. In an implementation, the image can be stored in a stage called an image repository. After receiving a request to pull an image(s) from the user of client account 128, image registry service 704 reads the requested image from cloud storage 104-1, and provides the image to the user.

A user can send various requests to container services cluster 702, including, for example, a request to execute a job (which requires a particular container to perform) or create a container service. In response to such a request(s), container services cluster 702 sends a request to pull an image for running on the cluster from image registry service 704. Again, prior to processing any requests from container services cluster 702, image registry service 704 communicates with compute service manager 108-1 to determine whether the requesting user has sufficient permission to perform such an operation(s). When the access-control check(s) has passed, after receiving the request, image registry service 704 reads the image from cloud storage 104-1, and can provide the image to container services cluster 702. After receiving the image, container services cluster 702 runs the container using the image.

In an example, image optimizer 742 performs optimizations on a given image to enable incremental loading of a given container image, where the image is split into various sets of files (e.g., "chunks"), which enables only a portion of the various sets of files to be? loaded (e.g., forgoing loading an entire image) in order to run the container by container services cluster 702. In this regard, image optimizer 742 can receive an uploaded image from image registry service 704 (e.g., an image that was pushed to image registry service 704), and generate a set of portions (e.g., chunks) of the image where each portion includes a particular set of files. Next, image optimizer 742 generates metadata including information comprising each particular set of files from each portion of the image. Finally, image optimizer 742 stores the set of portions of the image along with the metadata (e.g., as image artifacts in a different format to be discussed further below) on cloud storage 104-1. In an example, after being stored, the metadata can be updated with the locations of each portion of the image on cloud storage 104-1.

In an embodiment, image optimizer 742 can store each portion (e.g., chunk) of the image in a different and optimized format (e.g., different format based on a customized file system) when compared to how the image registry service 704 stores an entire (whole, unoptimized) image stored in cloud storage 104-1. The different format is based on a custom filesystem structure having a layout with a single metadata blob per file system instance, accompanied by an optional load order document (for content prefetching), and a variable number of content blobs. The relationship between content blobs and files in such a custom filesystem instance is many-to-many: small files may be grouped together into blobs, some files may have their own dedicated blobs, and large files may be split across multiple blobs. Moreover, there is not a fixed chunk size for content blobs. Content blobs may be shared by multiple custom filesystem instances. Metadata and content blobs are account-scoped (e.g., there is no cross-account sharing). All blobs are stored in an account-scoped object store (e.g., provided by cloud storage 104-1) and referenced in a distributed database such as FoundationDB (e.g., provided by database 114). Unreferenced blobs will be marked and swept.

In the context of storing portions of a given (container) image in this different format, in an embodiment, image optimizer 742 stores image manifest and layer blobs in cloud storage 104-1. In this example, a custom filesystem instance is built from the image manifest and layer blobs, resulting in custom filesystem metadata and content blobs uploaded to blob storage (e.g., provided by cloud storage 104-1) and referenced in the object store (e.g., provided by database 114). To speed up image conversion, per-layer custom filesystem instances (within an account) could be persisted to the object store, such that when a new image is pushed to image registry service 704, the custom filesystem instance can be built without reading all of the layer blobs. Instead, only the metadata blobs (from previously converted layers) and the image layer blobs (from newly uploaded layers) need to be read (e.g., by image registry service 704 later on when pulling portion(s) of the image).

In an example, the above discussed optimization of a given image can be performed after image registry service 704 has stored the (entire, unoptimized) image on cloud storage 104-1. In this example, it is possible that two separate copies (e.g., the original unoptimized image, and the optimized image with portions in the different format) of the image are stored in cloud storage 104-1.

In an example involving an optimized image, as discussed before, when container services cluster 702 sends a request to image registry service 704 to pull the (optimized) image, the (custom filesystem) metadata, as discussed above, is retrieved from cloud storage 104-1 and provided to container services cluster 702. In order to run the container associated with the requested image, container services cluster 702 uses the information from the metadata to determine which portion(s) of the image (e.g, which file(s)) are necessary to initially run the container, and retrieves those portion(s) from cloud storage 104-1. In this manner, the entirety of the files from the image is not retrieved to initially run (e.g., launch) the container within the cluster. Over time, as the container continues to run, container services cluster 702 determines whether other portions(s) of the image are needed to run the container and then can retrieve those portions from cloud storage 104-1 at that subsequent time.

The following discussion relates to operations for creating and dropping an image repository.

Users create a repository using a create image repository statement, which creates a stage (e.g., storage object backed by a cloud-based blob store) and an associated URL. Users can use this URL with the Docker CLI or any other OCI-compliant client.

To create a repository, a user can submit the following statement(s) in an OCI-compliant client:

```
CREATE [ OR REPLACE ] IMAGE REPOSITORY [ IF NOT EXISTS ]
<repo__name>
[ [ WITH ] TAG ( <tag__name> = '<tag__value>' [ , <tag__name> =
'<tag__value>' , ... ]
) ]
[ COMMENT = '<string__literal>' ]
```

The above statement creates a schema-level object where the image repository will reside. More specifically, the above statement creates a stage of type image_repository in the current schema.

The above statement generates a URL (e.g., "registry URL") for the user in the following format:

```
URL format:
https://<hostname>/<db__name>/<schema__name>/<repo__name>
Example URL:
https://org-my-acct.registry.XYZ.com/my__db/my__schema/my__ml__repo
```

In an implementation, a DNS mapping is performed to associate the URL to the image registry service that is running on the subject system. For example, image registry service 704 is listening on a port of an NLB (network load balancer) endpoint. The DNS mapping would map the URL hostname to the port of the NLB endpoint. In an example, an NLB is a multiple IP: PORTs (e.g., 3 for 3 AZs), and DNS can be mapped to all three IPs: PORT. In this example, this will be three address records. The clients can choose to use any of the three or load balance between the three.

Figure 8:
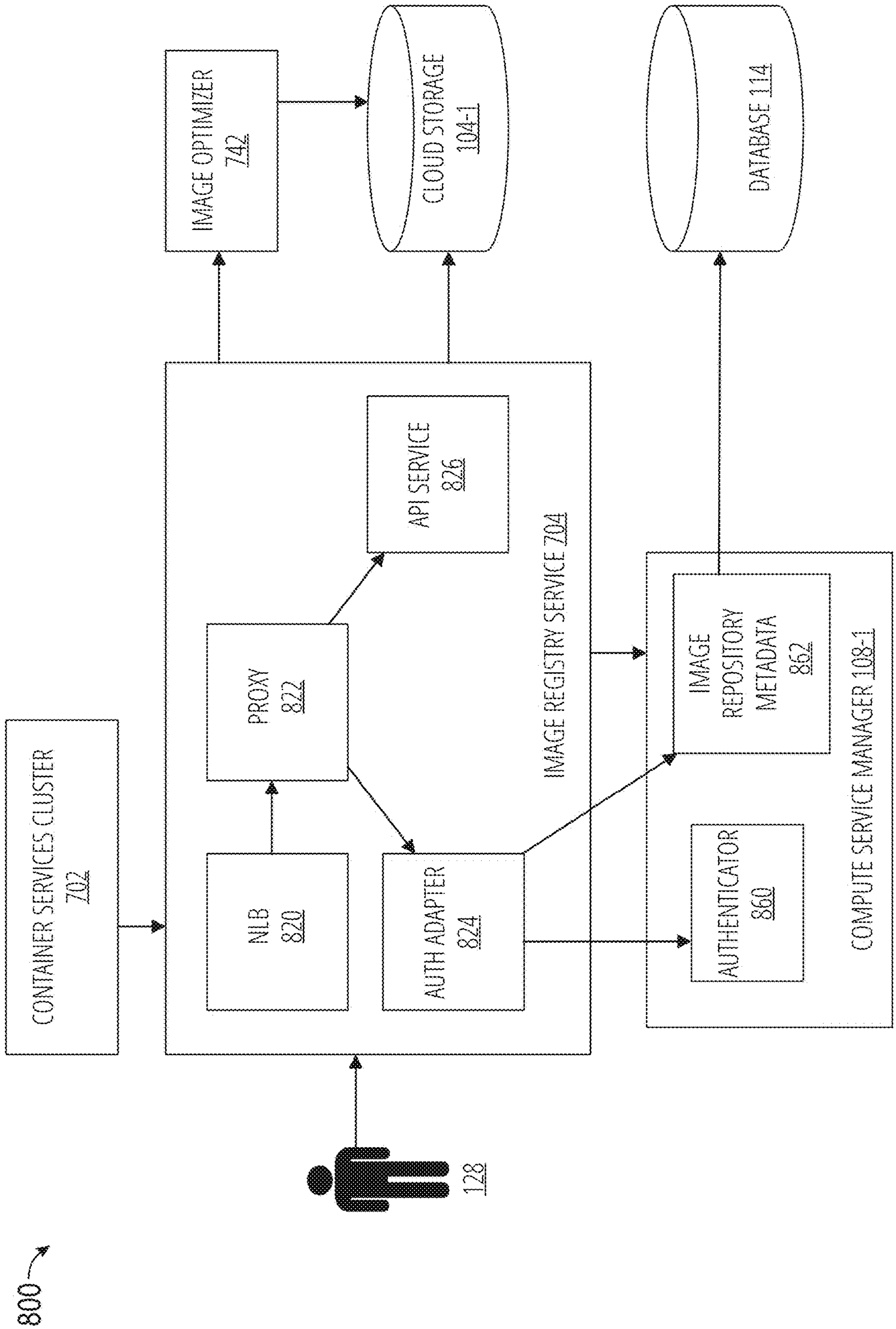
FIG. 8 illustrates another example of an architecture including an image registry service, in accordance with some embodiments of the subject technology.

Thus, when a user of an account (e.g., client account 128) creates a repository at an initial time, a DNS rule is created for their URL hostname to resolve to a name of an NLB of the image registry service (e.g., shown in FIG. 8). All future repositories under the same account will use the same hostname. After the DNS changes propagate, users can start making requests against these URLs.

A user of an account can log in using the following command:

docker login -u -p

A user, for example, can tag (e.g., assign a human-readable alias of an image) the image to the URL using the following command:

```
docker tag my__pt__image https://my__org- org-my-
acct.registry.com/my__db/my__schema/my__ml__repo/pytorch:latest
```

A user can push the tagged image using the following command:

```
docker push https://org-my-
acct.registry.XYZ.com/my__db/my__schema/my__ml__repo/pytorch:latest
```

Another supported command related to an image is listing the image repositories for which the requesting user has access privileges, and shown in the following statement(s) (e.g., an image repository discovery command on SQL):

```
SHOW IMAGE REPOSITORIES [ LIKE '<pattern>' ]
  [ IN
    {
      ACCOUNT   |
      DATABASE   |
      DATABASE <database__name> |
      SCHEMA   |
      SCHEMA <schema__name>   |
      <schema__name>
    }
  ]
```

Further, a command for providing a listing of all the tags associated with the image and the digest associated with them in an image repository can be performed by the following statement (e.g., an image repository discovery command on SQL):

SHOW IMAGES IN IMAGE REPOSITORY <name>

FIG. 8 illustrates another example of an architecture 800 including an image registry service, in accordance with some embodiments of the subject technology.

In the example of FIG. 8, architecture 800 includes components discussed in FIG. 7 (e.g., container services cluster 702, image registry service 704, image optimizer 742, cloud storage 104-1) and illustrates additional components in image registry service 704, compute service manager 108-1, and database 114.

As shown, image registry service 704 includes a network load balancer (NLB) 820, a proxy 822, an authentication and authorization adapter 824, and an API service 826. The compute service manager also includes an authenticator 860 and image repository metadata 862.

Requests from an OCI-compliant client and container services cluster 702 are received by NLB 820 of image registry service 704. In an implementation, NLB 820 may operate at the transport layer (Layer 4) of the OSI (Open Systems Interconnection) model and distribute incoming network traffic across a group of components based on data found in network and transport layer protocols, such as IP addresses and TCP or UDP ports. NLB 820 then sends each request to proxy 822.

In an implementation, proxy 822 provides the functionality of a load balancer, and facilitates communication between components included in compute service manager 108-1. More specifically, proxy 822 can operate at the application layer, and can make more complex decisions based on the content of the messages, headers, and other data within the application layer. For example, proxy 822 can perform tasks including URL routing, host-based routing, and application-specific tasks.

For access control using RBAC, authentication and authorization adapter 824 is a service that facilitates and manages authentication processes provided by computing service manager 108-1. For example, authentication and authorization adapter 824 communicates with authenticator 860 of compute service manager 108-1, where authenticator 860 determines whether a requesting user has sufficient permission to perform an operation(s) associated with the request by performing authentication and authorization checks for RBAC using at least information stored in image repository metadata 862.

When a role associated with the user passes the RBAC checks, proxy 822 communicates with API service 826 to perform any operation(s) for the request. API service 826 then can communicate with cloud storage 104-1 to complete the request.

The following is an example of a permissions matrix that depicts different permissions that are analyzed when performing RBAC checks:

| | List images | Pull images | Push images | Delete images | Create Services |
|---|---|---|---|---|---|
| Read | X | X | | | X |
| Write | | | X | X | |
| Ownership | X | X | X | X | X |

The following provides a discussion with more details regarding processing incoming requests in architecture 800. Each request against a registry URL is received by NLB 820. For each incoming request, proxy 822 sends a request (e.g., check_request RPC call) for external authorization to authentication and authorization adapter 824. The authentication and authorization adapter 824 handles the authentication and authorization against compute service manager 108-1.

Once authenticated and authorized, proxy 822 routes the request to the API service 826 which handles the push/pull of an image against cloud storage 104-1.

All requests rejected from the authentication and authorization adapter 824 receive an indication of an error (e.g., HTTP 401 response).

The following description provides more details related to authentication and authorization.

The authentication and authorization adapter 824 rejects every request without an authorization header with a 401 and a particular header indicating the client needs to authenticate against the /login endpoint. When a login request arrives with an authorization header, the authentication and authorization adapter 824 translates it to a /session/v1/login request against the compute service manager 108-1 and returns the session token back to the client upon success. This session token is then used as a bearer authorization header credential to authenticate the subsequent requests.

Depending on the type of request (read vs write), the authentication and authorization adapter 824 calls a system function to get repository metadata (e.g., to retrieve or read image repository metadata 862) on compute service manager 108-1 using the user's session token to 1) verify the required access to the repository and 2) obtain the temporary credentials to access the underlying location on cloud storage 104-1 on behalf of the user. When this call is successful, these credentials are added as the headers of the request by the authentication and authorization adapter 824 to propagate them to the distribution service for the actual data handling.

Figure 9:
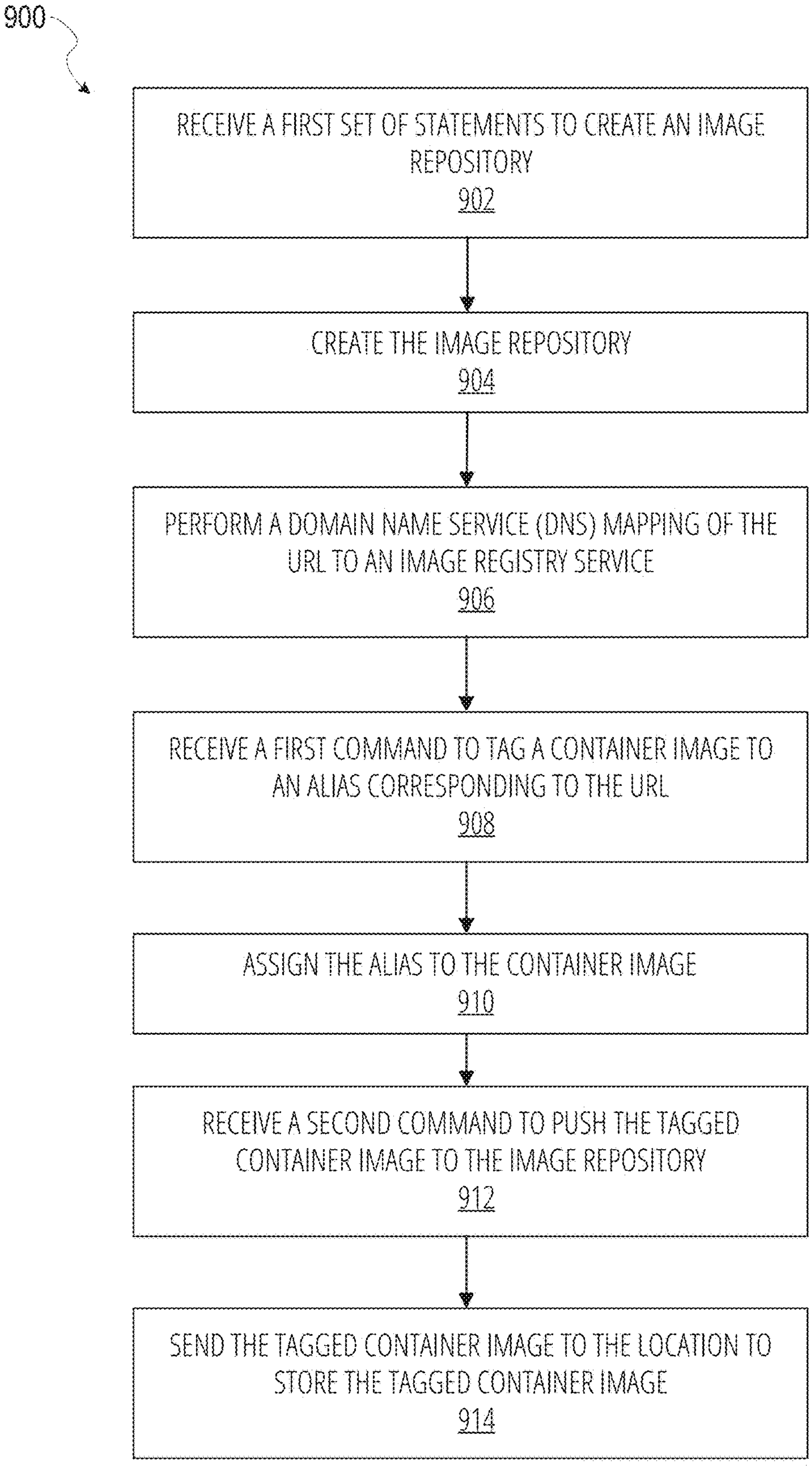
FIG. 9 is a flow diagram illustrating operations of a database system in performing a method, in accordance with some embodiments of the present disclosure.

FIG. 9 is a flow diagram illustrating operations of a database system in performing a method, in accordance with some embodiments of the present disclosure. The method 900 may be embodied in computer-readable instructions for execution by one or more hardware components (e.g., one or more processors) such that the operations of the method 900 may be performed by components of network-based database system 102. Accordingly, the method 900 is described below, by way of example with reference thereto. However, it shall be appreciated that method 900 may be deployed on various other hardware configurations and is not intended to be limited to deployment within the network-based database system 102.

At operation 902, image registry service 704 receives a first set of statements to create an image repository, the first set of statements comprising a set of Structured Query Language (SQL) statements.

At operation 904, image registry service 704 creates the image repository, the creating including generating a uniform resource locator (URL), the URL associated with a location for storing data.

At operation 906, image registry service 704 performs a domain name service (DNS) mapping of the URL to an image registry service.

At operation 908 image registry service 704 receives a first command to tag a container image to an alias corresponding to the URL.

At operation 910 image registry service 704 assigns the alias to the container image.

At operation 912 image registry service 704 receives a second command to push the tagged container image to the image repository.

At operation 914 image registry service 704 sends the tagged container image to the location to store the tagged container image.

Figure 10:
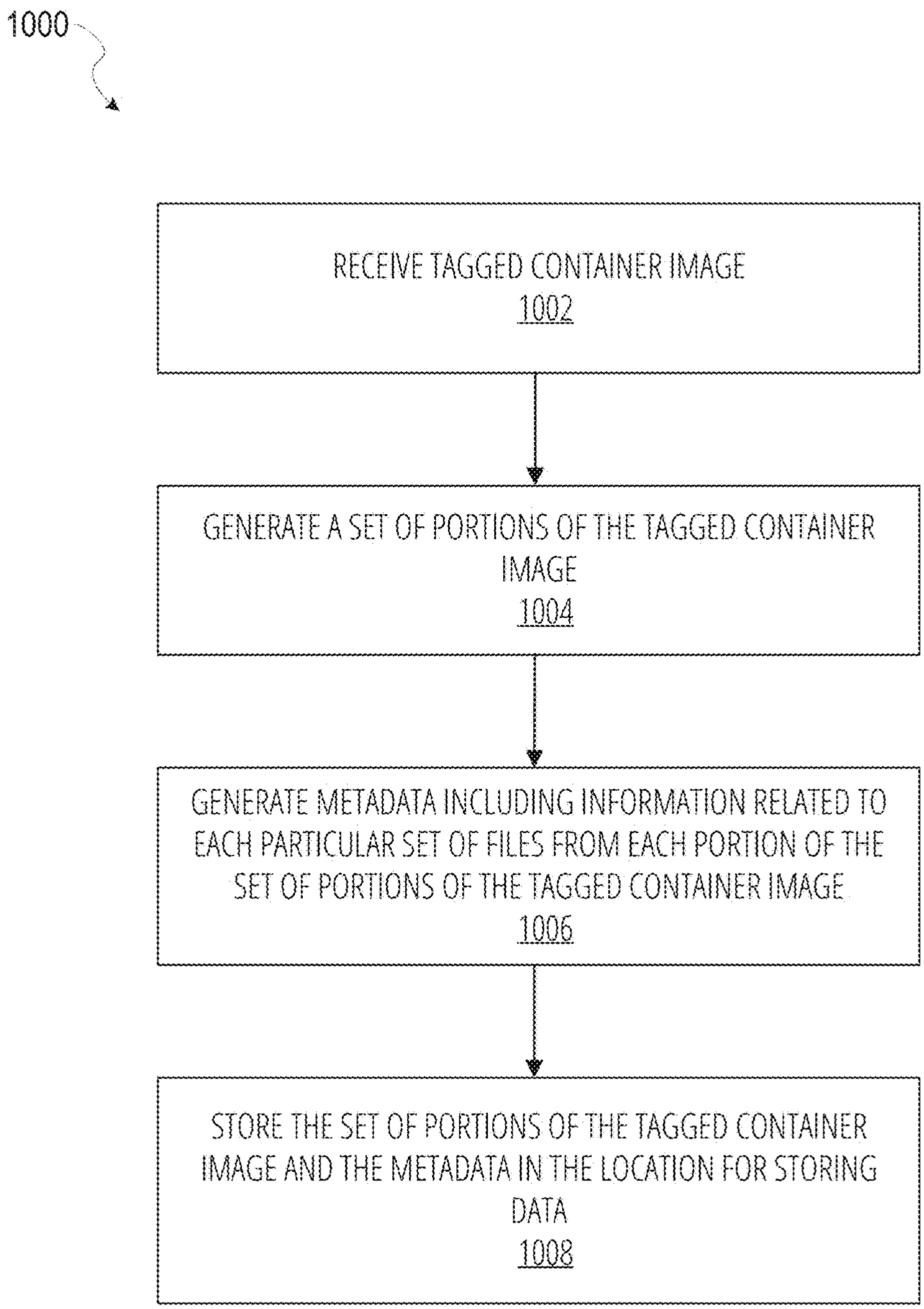
FIG. 10 is a flow diagram illustrating operations of a database system in performing a method, in accordance with some embodiments of the present disclosure.

FIG. 10 is a flow diagram illustrating operations of a database system in performing a method, in accordance with some embodiments of the present disclosure. The method 1000 may be embodied in computer-readable instructions for execution by one or more hardware components (e.g., one or more processors) such that the operations of the method 1000 may be performed by components of network-based database system 102. Accordingly, the method 1000 is described below, by way of example with reference thereto. However, it shall be appreciated that method 1000 may be deployed on various other hardware configurations and is not intended to be limited to deployment within the network-based database system 102.

At operation 1002, image optimizer 742 receives the tagged container image, the tagged container image being in a first format.

At operation 1004, image optimizer 742 generates a set of portions of the tagged container image, each portion including a particular set of files, the set of portions being in a second format different than the first format.

At operation 1006, image optimizer 742 generates metadata including information related to each particular set of files from each portion of the set of portions of the tagged container image, the metadata being in the second format different than the first format.

At operation 1008 image optimizer 742 stores the set of portions of the tagged container image and the metadata in the location for storing data.

Figure 11:
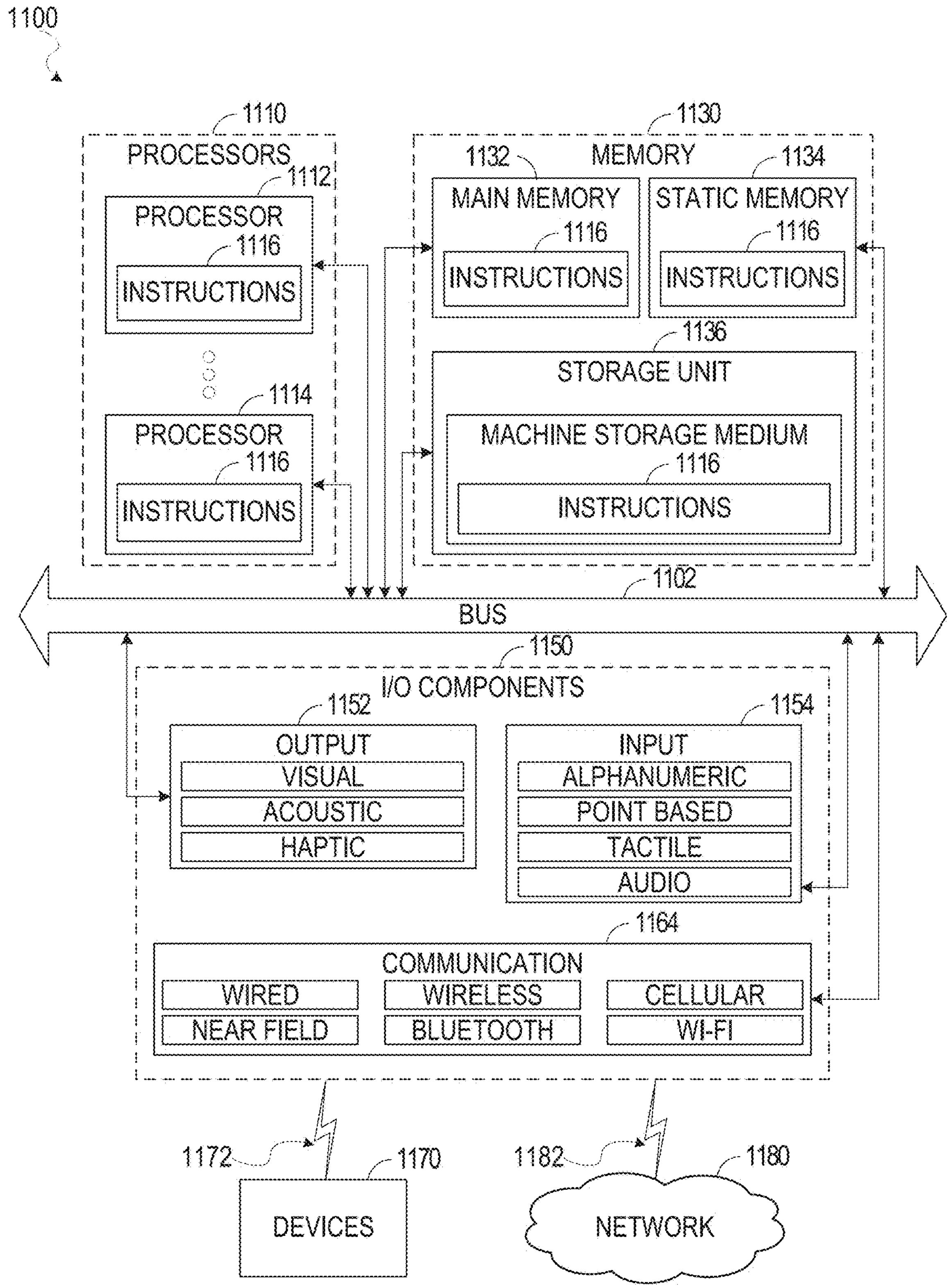
FIG. 11 illustrates a diagrammatic representation of a machine in the form of a computer system within which a set of instructions may be executed for causing the machine to perform any one or more of the methodologies discussed herein, in accordance with some embodiments of the present disclosure.

FIG. 11 illustrates a diagrammatic representation of a machine 1100 in the form of a computer system within which a set of instructions may be executed for causing the machine 1100 to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute any one or more operations of any one or more of the methods described above. As another example, the instructions 1116 may cause the machine 1100 to implement portions of the functionality illustrated in any one or more of the previously mentioned figures discussed above. In this way, the instructions 1116 transform a general, non-programmed machine into a particular machine 1100 (e.g., the compute service manager 108-1, the execution platform 110-1, and the user device 112) that is specially configured to carry out any one of the described and illustrated functions in the manner described herein.

In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 includes processors 1110, memory 1130, and input/output (I/O) components 1150 configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors 1110 that may comprise two or more independent processors (sometimes referred to as "cores") that may execute instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiple cores, or any combination thereof.

The memory 1130 may include a main memory 1132, a static memory 1134, and a storage unit 1136, all accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 include components to receive input, provide output, produce output, transmit information, exchange information, capture measurements, and so on. The specific I/O components 1150 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, and other communication components to provide communication via other modalities. The devices 1170 may be another machine or any of a wide variety of peripheral devices (e.g., a peripheral device coupled via a universal serial bus (USB)). For example, as noted above, the machine 1100 may correspond to any one of the compute service manager 108-1, the execution platform 110, and the devices 1170 may include the user device 112 or any other computing device described herein as being in communication with the network-based database system 112 or the storage platform 114.

Executable Instructions and Machine Storage Medium

The various memories (e.g., 1130, 1132, 1134, and/or memory of the processor(s) 1110 and/or the storage unit 1136) may store one or more sets of instructions 1116 and data structures (e.g., software) embodying or utilized by any one or more of the methodologies or functions described herein. These instructions 1116, when executed by the processor(s) 1110, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media,"

and "device-storage media" specifically exclude carrier waves, modulated data signals, and other such media, at least some of which are covered under the term "signal medium" discussed below.

Transmission Medium

In various example embodiments, one or more portions of the network 1180 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:

at least one hardware processor; and a memory storing instructions that cause the at least one hardware processor to perform operations comprising:

receiving a first set of statements to create an image repository, the first set of statements comprising a set of Structured Query Language (SQL) statements;

creating the image repository as a schema-level object within a database, the creating including generating a uniform resource locator (URL) configured for interaction by an Open Container Initiative (OCI)-compliant client, the URL associated with a location for storing data;

performing a domain name service (DNS) mapping of the URL to an image registry service;

receiving, from the OCI-compliant client, a first command to tag a container image to an alias corresponding to the URL, the container image comprising application code, and a runtime environment configuration for executing an application;

assigning the alias to the container image;

receiving, from the OCI-compliant client, a second command to push the tagged container image to the image repository; and sending the tagged container image to the location to store the tagged container image.

2. The system of claim 1, wherein performing the DNS mapping of the URL comprises:

mapping a hostname from the URL to a port of a network load balancer (NLB) provided by a compute service manager.

3. The system of claim 1, wherein the location for storing data comprises a cloud storage platform.

4. The system of claim 1, wherein the set of SQL statements comprises at least one SQL statement comprising a create image repository statement.

5. The system of claim 1, wherein an image registry service receives the first set of statements to create the image repository.

6. The system of claim 1, wherein the operations further comprise:

receiving the tagged container image, the tagged container image being in a first format;

generating a set of portions of the tagged container image, each portion including a particular set of files, the set of portions being in a second format different than the first format;

generating metadata including information related to each particular set of files from each portion of the set of portions of the tagged container image, the metadata being in the second format different than the first format; and storing the set of portions of the tagged container image and the metadata in the location for storing data.

7. The system of claim 6, wherein the operations further comprise:

receiving, from a container services cluster, a particular command to run a container based on the tagged container image;

performing a read operation on the metadata stored in the location for storing data; and sending the metadata to the container services cluster to facilitate running the container.

8. The system of claim 6, wherein the first format comprises a storage format that is native to a cloud storage platform providing the location for storing data.

9. The system of claim 6, wherein the second format comprises a custom filesystem, the custom filesystem comprising a metadata blob format for the metadata and a content blob format for the set of portions of the tagged container image.

10. The system of claim 7, wherein the operations further comprise:

sending a particular portion from the set of portions of the tagged container image, the particular portion comprising a subset of files associated with the tagged container image, the subset of files being sufficient to run an instance of the container based on the tagged container image.

11. A method comprising:

receiving a first set of statements to create an image repository, the first set of statements comprising a set of Structured Query Language (SQL) statements;

creating the image repository as a schema-level object within a database, the creating including generating a uniform resource locator (URL) configured for interaction by an Open Container Initiative (OCI)-compliant client, the URL associated with a location for storing data;

performing a domain name service (DNS) mapping of the URL to an image registry service;

receiving, from the OCI-compliant client, a first command to tag a container image to an alias corresponding to the URL, the container image comprising application code, and a runtime environment configuration for executing an application;

assigning the alias to the container image;

receiving, from the OCI-compliant client, a second command to push the tagged container image to the image repository; and sending the tagged container image to the location to store the tagged container image.

12. The method of claim 11, wherein performing the DNS mapping of the URL comprises:

mapping a hostname from the URL to a port of a network load balancer (NLB) provided by a compute service manager.

13. The method of claim 11, wherein the location for storing data comprises a cloud storage platform.

14. The method of claim 11, wherein the set of SQL statements comprises at least one SQL statement comprising a create image repository statement.

15. The method of claim 11, wherein an image registry service receives the first set of statements to create the image repository.

16. The method of claim 11, further comprising:

receiving the tagged container image, the tagged container image being in a first format;

generating a set of portions of the tagged container image, each portion including a particular set of files, the set of portions being in a second format different than the first format;

generating metadata including information related to each particular set of files from each portion of the set of portions of the tagged container image, the metadata being in the second format different than the first format; and storing the set of portions of the tagged container image and the metadata in the location for storing data.

17. The method of claim 16, further comprising:

receiving, from a container services cluster, a particular command to run a container based on the tagged container image;

performing a read operation on the metadata stored in the location for storing data; and sending the metadata to the container services cluster to facilitate running the container.

18. The method of claim 16, wherein the first format comprises a storage format that is native to a cloud storage platform providing the location for storing data.

19. The method of claim 16, wherein the second format comprises a custom filesystem, the custom filesystem comprising a metadata blob format for the metadata and a content blob format for the set of portions of the tagged container image.

20. A non-transitory computer-storage medium comprising instructions that, when executed by one or more processors of a machine, configure the machine to perform operations comprising:

receiving a first set of statements to create an image repository, the first set of statements comprising a set of Structured Query Language (SQL) statements;

creating the image repository as a schema-level object within a database, the creating including generating a uniform resource locator (URL) configured for interaction by an Open Container Initiative (OCI)-compliant client, the URL associated with a location for storing data;

performing a domain name service (DNS) mapping of the URL to an image registry service;

receiving, from the OCI-compliant client, a first command to tag a container image to an alias corresponding to the URL, the container image comprising application code, and a runtime environment configuration for executing an application;

assigning the alias to the container image;

receiving, from the OCI-compliant client, a second command to push the tagged container image to the image repository; and sending the tagged container image to the location to store the tagged container image.

* * * * *